(12) United States Patent
Kah et al.

(10) Patent No.: US 9,373,862 B2
(45) Date of Patent: Jun. 21, 2016

(54) THERMAL MANAGEMENT IN A FUEL CELL STACK

(75) Inventors: Michael Kah, Frankston (AU); Roger Bolden, Geelong (AU)

(73) Assignee: CHAOZHOU THREE-CIRCLE (GROUP) CO., LTD., Chaozhou (CN)

( * ) Notice: Subject to any disclaimer, the term of this patent is extended or adjusted under 35 U.S.C. 154(b) by 482 days.

(21) Appl. No.: 13/641,334

(22) PCT Filed: Apr. 15, 2011

(86) PCT No.: PCT/AU2011/000439
§ 371 (c)(1),
(2), (4) Date: Feb. 4, 2013

(87) PCT Pub. No.: WO2011/127541
PCT Pub. Date: Oct. 20, 2011

(65) Prior Publication Data
US 2013/0130139 A1    May 23, 2013

(30) Foreign Application Priority Data

Apr. 15, 2010   (AU) ................. 2010901603

(51) Int. Cl.
*H01M 8/06* (2006.01)
*H01M 8/24* (2016.01)
(Continued)

(52) U.S. Cl.
CPC ........ *H01M 8/0637* (2013.01); *H01M 8/04007* (2013.01); *H01M 8/04074* (2013.01);
(Continued)

(58) Field of Classification Search
CPC ............ H01M 2008/1293; H01M 2008/147; H01M 8/04007; H01M 8/04074; H01M 8/0637; H01M 8/24; H01M 8/2425; H01M 8/2465

See application file for complete search history.

(56) References Cited

U.S. PATENT DOCUMENTS 5,478,662 A   12/1995   Strasser
6,033,794 A   3/2000    George et al.
(Continued)

FOREIGN PATENT DOCUMENTS

EP    0263052 B1    2/1991
EP    0596 366 A1   10/1993
(Continued)

OTHER PUBLICATIONS

Masayuki et al., JP2003272645 (Machine English translation), Sep. 26, 2003.*
(Continued)

*Primary Examiner* — Patrick Ryan
*Assistant Examiner* — Jose Colucci Rios
(74) *Attorney, Agent, or Firm* — Banner & Witcoff, Ltd.

(57) ABSTRACT

A fuel cell stack comprising multiple arrays of one or more fuel cells, each comprising an electrolyte layer, an anode layer and a cathode layer; gas separator plates between adjacent fuel cells; and oxidant gas distribution passages and fuel gas distribution passages between adjacent fuel cells; and gas separators opening to the cathode layers and the anode layers, respectively, of the fuel cells. The fuel cell arrays comprise at least first stage fuel cell arrays having associated first fuel gas distribution passages to receive fuel gas from one or more fuel gas supply manifolds and second stage fuel cell arrays having associated second fuel gas distribution passages which receive fuel exhaust from the fuel cells of the first stage fuel cell arrays. The second stage fuel cell arrays are interleaved in the stack between first stage fuel cell arrays to improve thermal gradients. Other interleaving arrangements are possible.

21 Claims, 11 Drawing Sheets

(51) Int. Cl.
*H01M 8/04* (2016.01)
*H01M 8/12* (2016.01)
*H01M 8/14* (2006.01)

(52) U.S. Cl.
CPC .............. *H01M8/24* (2013.01); *H01M 8/2425* (2013.01); *H01M 8/2465* (2013.01); *H01M 8/2485* (2013.01); *H01M 2008/1293* (2013.01); *H01M 2008/147* (2013.01); *Y02E 60/50* (2013.01); *Y02E 60/525* (2013.01); *Y02E 60/526* (2013.01)

(56) References Cited

U.S. PATENT DOCUMENTS

| | | | |
|---|---|---|---|
| 7,108,929 | B2 | 9/2006 | Kurtz et al. |
| 7,482,073 | B2 | 1/2009 | Bette et al. |
| 2003/0054223 | A1 | 3/2003 | Baba et al. |
| 2004/0023097 | A1* | 2/2004 | Bette et al. ............. 429/34 |
| 2005/0037249 | A1* | 2/2005 | Zizelman et al. ............. 429/26 |
| 2006/0127709 | A1 | 6/2006 | Bai et al. |
| 2007/0099037 | A1 | 5/2007 | Senner |
| 2008/0248349 | A1* | 10/2008 | McElroy et al. ............. 429/20 |

FOREIGN PATENT DOCUMENTS

| | | |
|---|---|---|
| JP | S63091966 A1 | 4/1988 |
| JP | H1167258 A | 3/1999 |
| JP | 2003-92129 | 3/2003 |
| JP | 03272645 A | 9/2003 |
| JP | 2007-128889 A | 5/2007 |
| WO | WO 96/28855 | 9/1996 |
| WO | 03019707 A1 | 3/2003 |
| WO | 2009148505 A2 | 12/2009 |

OTHER PUBLICATIONS

International Search Report for PCT/AU2011/000439 Dated Jul. 4, 2011.
Japanese Office Action Summary for Application No. 2013-504066, 1 sheet dated Feb. 19, 2015.

* cited by examiner

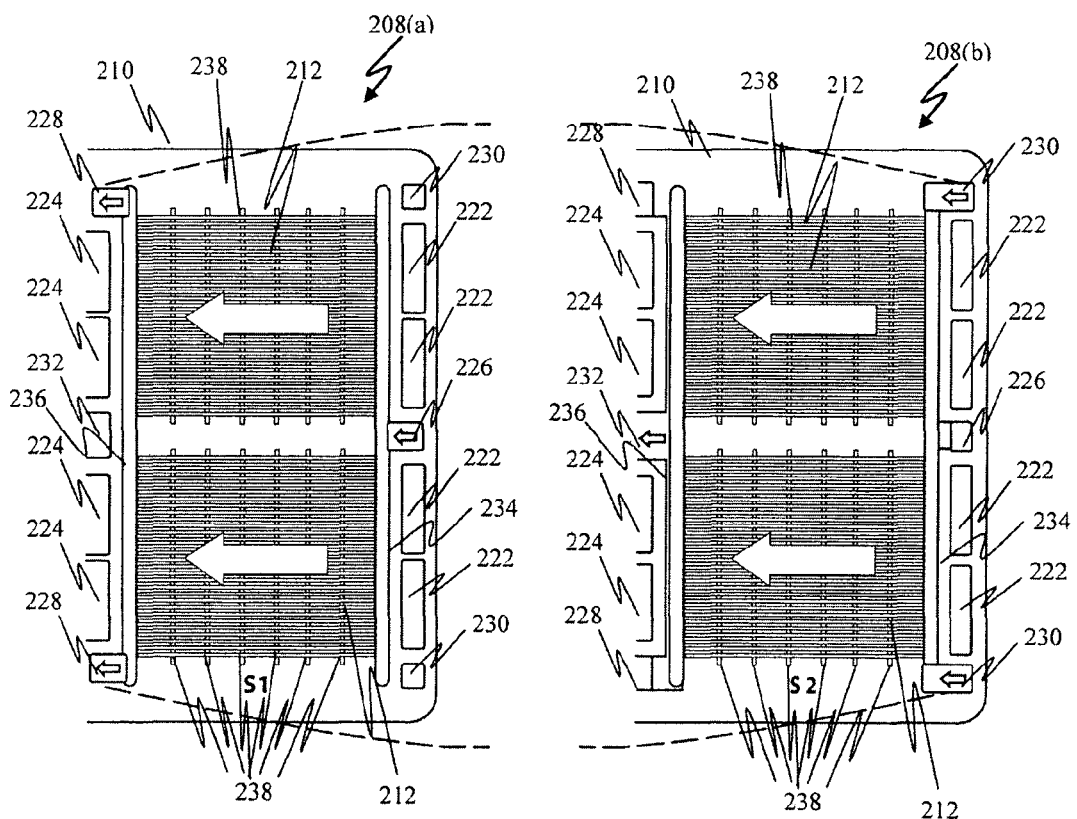
FIGURE 5(A)          FIGURE 5(B)
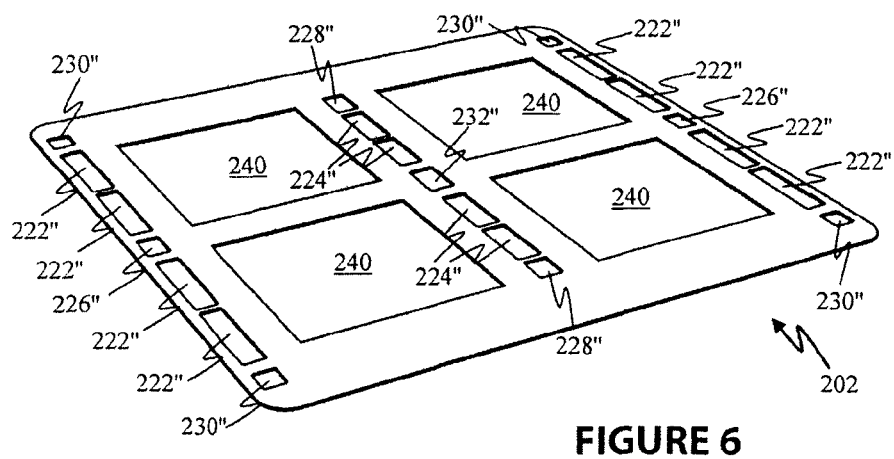
FIGURE 6

THERMAL MANAGEMENT IN A FUEL CELL STACK

This application is a national stage application of co-pending PCT application PCT/AU2011/000439 filed Apr. 15 2011. The disclosure of this application is expressly incorporated herein by reference in its entirety.

TECHNICAL FIELD

The present invention relates generally to fuel cells, and is particularly concerned with improving thermal gradients in a fuel cell stack while allowing high fuel utilisations.

BACKGROUND ART

A fuel cell is an electrochemical device comprising an electrolyte and respective electrodes (an anode and a cathode) on opposite sides of the electrolyte. Fuel cells may take a variety of different configurations, including planar and tubular. Electrochemical reactions are produced at the electrodes by passing a fuel gas stream across the anode and an oxidant gas stream across the cathode. In the purest form of the reactions, in which the fuel is hydrogen, the outcome is electricity and water, as well as heat since the reactions are exothermic.

In order to produce a useful amount of electricity, a multitude of fuel cells are stacked together in layers, with the stacked fuel cells being electrically connected in series and a load being electrically connected to the ends of the stack. Connecting the layers in series allows for the same current/current density in every layer. A plurality of these stacks may be electrically connected together, but the present invention particularly relates to individual stacks. More than one fuel cell may be provided in each layer of the stack, plural such fuel cells in a layer (at array) being electrically connected in parallel. Adjacent fuel cells, or arrays of fuel cells, in the stack may be separated from each other by one or more of a gas separator, a spacer, a current collector, a seal and possibly other layer components. In a planar fuel cell stack the fuel cells and other stack components are disposed between terminal end plates, which may also provide a manifolding function for the supply and exhaust of the fuel and oxidant gases.

As described above, fuel gas may be supplied to the fuel cells as hydrogen, optionally pre-reformed from hydrocarbon, or, in a suitable high temperature fuel cell stack, such as a solid oxide fuel cell (SOFC) stack or a molten carbonate fuel cell (MCFC) stack, it may alternatively be supplied as a hydrocarbon such as natural gas which is reformed in the stack. The oxidant gas may be pure oxygen, but is more usually air. The gases are commonly supplied to and exhausted from stacked multiple fuel cells or fuel cell arrays through fuel and oxidant supply and exhaust manifolds with fuel and oxidant distribution passages opening to the anodes and cathodes, respectively.

Reforming of hydrocarbons to provide hydrogen as a fuel is an endothermic reaction which, if performed in the stack, is supported by the exothermic oxidation of the fuel on the anodes of the high temperature ($\geq 650°$ C.) fuel cells. Care is needed to avoid excess cooling from the endothermic reforming reaction.

High efficiency of electricity production in a fuel cell stack requires high fuel utilisation—for example up to 80 to 95% of the fuel supplied to the anodes being oxidised, in the fuel cell reaction. 100% fuel utilisation, or close to it, does not lead to high efficiency because the cell voltage tends to collapse. If there is an inadequate fuel supply to any one fuel cell, that fuel cell can oxidise and cause failure of the cell and, ultimately, of the stack.

Fuel flow to each individual cell or array is controlled by the pressure drop across the fuel supply passages, for example channels in a gas connector, for the cell/array, and hence is determined by the manufacturing tolerance. Manufacturing costs, increase substantially with higher accuracy of the manufacturing process. In order to achieve a fuel utilisation of, say, 90% the flow variation needs to be well below 10%, which would require very high precision and therefore, in one embodiment, expensive gas separators to avoid cell and stack failure. Failure due to over utilisation of individual cells/arrays can only be avoided if flow variation is known and accounted for in the operation. If, for example, the flow variation (due to manufacturing tolerances and thermal effects) is ±20% for a two layer stack and if the cells can be operated at up to 95% fuel utilisation, the overall fuel utilisation of the stack can not exceed 76% in order to avoid damage due to over utilization. The individual fuel utilisation for the above case would be 95% for the low fuel flow layer and 63% for the high fuel flow layer. Failure tolerance of a fuel cell stack due to performance variation or other failure of one fuel cell can be alleviated by the use of arrays of fuel cells in a stack, but invariably an excess of fuel gas must be supplied to the fuel cells in order to minimise the risk of fuel cell oxidation. The outcome of this is that there is unused fuel in the fuel gas exhausted from the fuel cells, that is individual fuel cells and fuel cell arrays are run at relatively low fuel utilisations. The variability of fuel utilisation across different cells/arrays will also lead to a changed thermal profile—higher thermal gradients in cells/arrays that have higher fuel utilisation and vice versa. This can also contribute to stack failures or will at least restrict the maximum fuel utilisation to avoid failures.

In order to improve the overall fuel utilisation, and therefore the efficiency of the fuel cell stack, it has been proposed to recycle the fuel exhaust to the fuel cell stack and mix it with freshly supplied fuel gas. The main advantage of this approach is that the actual fuel utilisation within each cell/array is reduced while the overall utilisation can be very high, depending on the recycling ratio. This also has the advantage of introducing steam, as a product of the fuel cell reaction, to the freshly supplied fuel gas. Steam is necessary for internally reforming hydrocarbons to hydrogen fuel and recycling fuel exhaust means that the freshly supplied fuel gas needs less steam added. See for example WO 2003/019707.

It has also been proposed to improve the overall fuel utilisation of a fuel cell system comprising plural stacks of fuel cells by using the fuel exhaust from one or more stacks as the fuel gas supplied to another stack. One such proposal is in EP 0263052, in which two embodiments are described: a first, in which the fuel gas exhaust from two fuel cell stacks in a first stage is combined and used as the fuel gas supply to a third stack in a second stage; and a second, in which the fuel gas exhaust from one stack (stage 1) is used as the fuel gas supply for a second stack (stage 2) and the fuel gas exhaust from that stack is used as the fuel gas supply for a third stack (stage 3). This proposal is described in U.S. Pat. No. 7,108,929 as involving "the use of a plurality of reactant transfer lines from one stage to the next, which can become complicated and require complicated transfer line assemblies."

U.S. Pat. No. 7,108,929 is directed to a unitary manifold assembly for use in controlling the flow of reactant gas streams between a plurality of fuel cell stacks, and particularly for combining the fuel gas exhaust from a plurality of fuel cell stacks in a first stage and supplying the combined fuel gas exhaust from the first stage to at least one further fuel cell stack in a second stage.

U.S. Pat. No. 7,482,073 also discloses a multi-stack arrangement with fuel exhaust utilisation from one stack in another stack. In a described embodiment, the fuel exhaust gas from three parallel stacks in a first stage is combined and used as the fuel supply gas to a fourth stack in a second stage. The fuel exhaust gas from the fourth stack is used as the fuel supply gas to a fifth stack in a third stage, and the fuel exhaust gas from that stack is used as the fuel supply gas to a sixth stack in a fourth stage. No reforming of the fuel gas is required in this proposal as it is hermetically sealed and uses hydrogen as the fuel and pure $O_2$ as the oxidant. Water is condensed from the fuel exhaust gas between each stage.

Using the fuel exhaust from one or more fuel cell stacks in a first stage as the fuel supply gas to another stack in a second stage, and so forth, has the advantage of allowing the fuel utilisation in individual fuel cell, stacks to be reduced, and therefore manufacturing tolerances to be eased and cost to be reduced, while giving relatively high overall fuel utilisation. However, the stacks in the different stages are likely to run at different temperatures which, unless they are specifically designed to do so, will impact on their useful lifetimes and their performance. Additionally, more complicated manifolding is required for transferring the fuel exhaust gas from one stack to another. Furthermore, either individual current control for each stack or additional wiring is required, with higher associated costs in either case, and, in the latter case, an increased risk of electrical shorting of the stacks and potentially higher heat losses.

U.S. Pat. No. 6,033,794 also discloses a multi-stage fuel cell system, illustrated in a common pressure vessel, where each stage comprises a stack of fuel cells and the fuel exhaust gas from any one stack is used as the fuel supply gas to a next subsequent stack, but in this case the system is designed to accommodate the different operating temperatures of each stage. This is achieved by each stage being made of a different material, adding considerably to the complexity of the system. The proposal does allow higher fuel utilisation compared to a normal stack, but only at the expense of lower current density in the following stages, and therefore in the following stacks. For example, stage 1 and stage 2 both run at 50% fuel utilisation, leading to 75% overall fuel utilisation, but stage 2 will run at half the current density because it only has 25% of the fuel flow available.

In contrast to the aforementioned prior proposals, in which the fuel exhaust from one stack in a multi-stack arrangement is supplied as fuel to a next subsequent stack, U.S. Pat. No. 5,478,662 (corresponding to EP 0596366 referred to in U.S. Pat. No. 7,482,073 above) describes a fuel cell block or stack comprising sequential multiple stages. Each stage in this proposal comprises plural fuel cells grouped together (optionally with a single fuel cell in the last stage), with some of the fuel exhaust gas from any one stage being used as the fuel supply gas, along with fresh fuel gas, in the next subsequent stage along the stack. The remainder of the fuel exhaust gas from any one stage is discharged to remove water and inert gas components that build up along the fuel gas flow path. This arrangement leads to improved fuel utilisation but only as a result of the discharge of the inerts and the additional fresh fuel gas. Therefore, the amount of fuel available for the electrochemical reaction in the fuel cells in each stage can be kept constant, or at least similar, but the total fuel flow must increase due to the increasing amount of reaction products.

Temperature gradients arise in and between fuel cell stacks due to fuel flow variations across the fuel cells, leading to different cell voltages. In high temperature SOFC or MCFC stacks, temperature gradients can also arise due to different levels of hydrocarbon fuel reforming within the or each stack as well as due to differences in heat loss.

In a high temperature fuel cell system, particularly an SOFC system, such temperature differentials or gradients along and across a fuel cell stack can lead to varied thermal expansion induced stresses along the stack and consequential cracking and failure of the components.

It would be desirable to provide a stack of fuel cells, or fuel cell arrays, which is capable of operating at a high fuel utilisation while alleviating temperature differentials along the stack, and therefore alleviating differential thermal expansion induced stress.

SUMMARY OF THE INVENTION

According to the present invention there is provided a fuel cell assembly comprising:

a stack of multiple fuel cell arrays, each fuel cell array comprising one or more fuel cells and each fuel cell comprising an electrolyte layer, an anode layer on one side of the electrolyte layer and a cathode layer on an opposite side of the electrolyte layer, said stack further comprising fuel gas distribution passages which open to the anode layers of the fuel cells in the stack;

one or more fuel supply manifolds for supplying fuel gas to fuel gas distribution passages in the stack;

the fuel cell arrays comprising at least first stage fuel cell arrays having associated first fuel gas distribution passages connected to the one or more fuel gas supply manifolds to receive fuel gas directly therefrom and second stage fuel cell arrays having associated second fuel gas distribution passages arranged to receive fuel exhaust from the fuel cells of the first stage fuel cell arrays for supply of said fuel exhaust to the fuel cells of the second stage fuel cell arrays in the stack; and wherein at least one of the first and second stages of fuel cell arrays comprises fuel cell arrays that are disposed in the stack, between fuel cell arrays of the other of the first and second stages of fuel cell arrays.

By the present invention, high fuel utilisation, and therefore high fuel cell efficiency; is achievable in the overall stack by using fuel exhaust from the first stage fuel cell arrays in at least the second stage fuel cell arrays. This can be achieved while maintaining the same or similar current densities across the stages, using a readily available fuel such as pre-reformed natural, gas. Since the high fuel utilisation can be achieved with relatively low fuel utilisation in, individual, fuel cell arrays, tolerances in the fuel, gas distribution passages can be reduced, thereby reducing manufacturing costs. A reduced temperature gradient along the stack, compared to a stack in which all of the first stage fuel cell arrays are at one end of the stack and all of the second stage fuel cell arrays are at the opposite end of the stack, is achieved by providing for at least one of the first and second stage fuel cell arrays to comprise fuel cell arrays that are disposed in the stack between fuel cell arrays of the other of the first and second stage of the fuel cell arrays, thereby improving thermal transfer and balance along the stack. In such an arrangement, the fuel cell arrays of each of the first and second stages of fuel cell arrays are disposed in the stack so as not to all be adjacent to one another. The arrangement, in which one or more of the fuel cell arrays of the one of the first and second stage fuel cell arrays are interleaved between two of the fuel cell arrays of the other of the first and second stage fuel cell arrays, permits thermal transfer between adjacent fuel cell arrays of different stages, and therefore reduced thermal gradients along the stack. Such interleaving may be repeated in the stack for further reduced thermal gradients, in which case each of the first and second stages of fuel cell arrays may comprise fuel cell arrays that are disposed in the stack between fuel cell arrays of the other stage. In one embodiment, each fuel cell array of the one of the first and second stages of fuel cell arrays is disposed adjacent to at least one fuel cell array of the other of the first and second stages of fuel cell arrays.

As described hereinafter, third and even fourth stage fuel cell arrays may also be provided in the stack, each third stage fuel cell array receiving fuel exhaust gas from second stage fuel cell arrays and each fourth stage fuel cell array receiving fuel exhaust gas from third stage fuel cell arrays. By "adjacent to at least one fuel cell array of the other of the first and second stages" in the aforementioned embodiment is meant that no other fuel cell array of the same stage is disposed in the stack between said fuel cell arrays. As also described hereinafter, other stack components may be disposed between adjacent fuel cell arrays.

In the present invention, preferably each fuel cell array comprises plural fuel cells, for example two, three or four or more, connected in parallel. This has the advantage of reducing risk to the stack should one fuel cell have a reduced performance or fail, of reducing the cost of individual fuel cells, and of reducing thermal stress compared to a single fuel cell. The resulting more even temperature across the array can lead to improved fuel cell performance and life. The cost and thermal stress of individual fuel cells in such an array may be reduced due to their smaller size.

A temperature differential may arise between fuel cell arrays of different stages because of fuel flow composition variations and different voltage levels in one stage compared to another. However, in one embodiment of a high temperature fuel cell system, at least some of the first stage fuel cell arrays have anode layers and/or associated first fuel gas distribution passages that comprise steam reforming catalyst for steam reforming to hydrogen and other reaction gases hydrocarbon in the fuel gas contacting said anode layers and/or first fuel gas distribution passages. As noted above, the steam reforming reaction is endothermic, with the result that those first stage fuel cell arrays may be at a lower temperature than any adjacent subsequent stage fuel cell array. Reduced steam reforming of the fuel gas would be performed in subsequent fuel cell arrays, even if they comprise reforming catalyst (they may have the same structure and materials as the first stage fuel cell arrays), since a hydrocarbon fuel gas will already have been steam reformed to at least a major extent for the fuel cell reactions in the first stage fuel cell arrays. Generally, steam reforming of a hydrocarbon fuel in the first stage fuel cell arrays will be at least 75% complete, but in an efficient system may be at least 90% complete. Most preferably, this reforming rate is 99% or greater, but it may degrade, with time over the period of use of the fuel cell stack.

In another embodiment, the fuel cell stack also comprises specific steam reforming, non-fuel cell layers between some adjacent fuel cell arrays for internal steam reforming reactions to occur there in addition to in some or all of the first stage fuel cell arrays and/or of the first fuel gas distribution passages. Such non-fuel cell reforming layers may comprise essentially nickel or other reforming catalyst. Since no exothermic fuel cell reactions will occur in such layers they will not be heated directly and will absorb heat from the adjacent fuel cell arrays. For this reason, no more than one such layer should be disposed between adjacent fuel cell arrays. Each steam reforming, non fuel cell layer may be disposed between two first stage fuel cell arrays, between one first stage fuel cell array and one subsequent stage fuel cell array, or between two subsequent stage fuel cell arrays (which may be of the same or different stages).

Allowing some of the internal steam reforming to be performed by non-fuel cell layers may allow the number of first stage fuel cell arrays to be reduced relative to an internal reforming stack without such non-fuel cell reforming layers.

In an embodiment including the steam reforming, non-fuel cell layers, such layers will receive fuel gas from the one or more fuel gas supply manifolds and supply steam reformed fuel gas to the first stage fuel cell arrays, and the phrase "to receive fuel gas directly therefrom" used herein shall be construed accordingly. Thus, the phrase "first stage fuel cell arrays having associated first fuel gas distribution passages connected to the one or more fuel gas supply manifolds to receive fuel gas directly therefrom" means that the fuel gas received by the first fuel gas distribution passages has not passed through fuel gas distribution passages associated with any other fuel cell arrays in the stack.

An inlet side of the second fuel gas distribution passages opening to the anode layer of each fuel cell of the second stage fuel cell arrays may be connected directly to an exhaust side of the first fuel gas distribution passages opening to the anode layers of at least two fuel cells of the first stage fuel cell arrays.

Alternatively, and in a more preferred embodiment, at least one fuel manifold is provided between an inlet side of the second fuel, gas distribution passages and an exhaust side of the first fuel gas distribution passages to supply fuel exhaust from some or all first fuel gas distribution passages to some or all second fuel gas distribution passages. Advantages of this include a greater mixing of the fuel exhaust gases from the first fuel gas distribution passages, giving higher reliability for the stack due to balancing flow variations and greater tolerance to faults arising in any first stage fuel cell or fuel cell array. In this embodiment, said at least one fuel manifold may comprise a fuel exhaust outlet manifold connected to a fuel exhaust inlet manifold whereby fuel exhaust from some or all of the first fuel gas distribution passages passes in one direction through the fuel exhaust outlet manifold and in an opposite direction through the fuel exhaust inlet manifold to some or all of the second fuel gas distribution passages. The fuel exhaust outlet and inlet manifolds may be connected in a terminal end plate of the stack. In a vertical stack, preferably said one direction is upwardly and said opposite direction is downwardly. This will have advantages in fuel flow distribution to the individual layers within each stage and may have thermal gradient advantages along the stack.

Advantageously, the flow direction of fuel gas through the one or more fuel supply manifolds is also said one direction, so that the fuel supply to the first fuel gas distribution passages is in the same direction as the exhaust from these passages. Preferably, the manifold fuel gas supply to the fuel gas distribution passages of each subsequent stage is in the same direction as the manifold fuel exhaust gas flow from these passages, and, for at least the second fuel gas distribution passages, opposite to the corresponding flows to the fuel cell arrays of the preceding stage. This arrangement helps in providing uniformity of fuel distribution to the various layers in the stack. The manifold fuel, exhaust gas supplies to the second and any subsequent stages are conveniently in the same direction.

The particular arrangement, of first stage and second stage fuel cell arrays, and of subsequent stage arrays where they are present in the stack, will depend upon the thermal balancing required in the stack, and therefore upon the expected fuel utilisation at each array and the reactions that are to be performed in each array, as well as the presence and locations of any steam reforming non-fuel cell layers. However, in one embodiment each second stage fuel cell array is disposed in the stack between a respective two first stage fuel cell arrays. In one example, in at least part of the stack there is a repeating pattern of three first stage fuel cell arrays and one second stage fuel cell array. In another example, in at least part of the stack there is a repeating pattern of four first stage fuel cell arrays and one second stage fuel cell array. Such a repeating pattern, or any other repeating pattern, could extend throughout the stack. Alternatively, there could be a greater number of second stage fuel cell arrays in a first half of the stack than in a second half of the stack. For example, the first half may be the bottom half in a vertical stack in which steam reforming is performed in the first stage fuel cell arrays. In this arrangement, the relatively greater number of first stage fuel cell arrays in the top half of the stack will provide increased cooling of the top half of the stack. Also in this, in another arrangement, there may be relatively fewer reforming first stage fuel cell arrays towards the ends of the stack than in between, since heat loss from the stack will generally be higher towards the ends. Each end portion may comprise a respective 25% of the length of the stack and the portion in between may comprise the central 50% of the length of the stack. In embodiments of this arrangement the proportion of second stage fuel cell arrays in each end quarter of the stack is at least twice as great as in the central half of the stack. In one example of this arrangement the ratio of first stage to second stage fuel cell arrays may be about 2:1 in the end portions of the stack, compared to about 6:1 in the central portion. In terms of the spacing of the second stage fuel bell arrays between the first stage fuel cell arrays, the two halves of the stack from respective ends may be mirror images of each other. In a vertical stack, in both this and other embodiments there may be the greatest concentration of stage one fuel cell arrays at about one half or at about two thirds the height of the stack, or between about one half and about two thirds the height of the stack.

In one embodiment, all of the second fuel gas distribution passages are connected to at least one fuel exhaust manifold for directing fuel exhaust from the second stage fuel cell arrays, and therefore from the exhaust side of the second fuel gas distribution passages, exteriorly of the stack or for recycling to the stack.

Alternatively, as mentioned above and in another embodiment, the fuel cell arrays further comprise at least one third stage fuel cell array having associated third fuel gas distribution passages arranged to receive fuel exhaust from fuel cells of the second stage fuel, cell arrays for supply of said fuel exhaust to the fuel cells of the third stage fuel cell array or arrays in the stack.

In this other embodiment, at least one fuel manifold may be provided between an inlet side of the third fuel gas distribution passages and an exhaust side of the second fuel gas distribution passages to supply fuel exhaust from the second fuel gas distribution passages to the third fuel gas distribution passages.

The at least one fuel manifold between the second and third fuel gas distribution passages may comprise a fuel exhaust outlet manifold connected to a fuel exhaust inlet manifold whereby fuel exhaust from the second fuel gas distribution passages passes in one direction, preferably downwardly in a vertical stack, through the fuel exhaust outlet manifold and in an opposite direction, or more conveniently the same direction, through the fuel exhaust inlet manifold to the third gas distribution passages. These fuel exhaust outlet and inlet manifolds may be connected in a terminal end plate of the stack.

Each third stage fuel cell array, in one embodiment, may be disposed in the stack adjacent at least one first stage fuel cell array, for example between two first stage fuel cell arrays.

In one arrangement of this other embodiment, all of the second stage fuel cell arrays are disposed towards a first end of the stack, for example the top end in a vertical stack, and all of the third stage fuel cell arrays are disposed towards a second, opposite end of the stack. In one example of this arrangement, the stack is supplied with fuel gas at said second, opposite end, the fuel gas then being transmitted through said one or more fuel supply manifolds.

The number of first stage fuel cell arrays in a two stage stack may be, for example, in the range of 64 to 82 percent of the total number of fuel cell arrays in the stack.

The number of first stage, fuel cell arrays in a three stage stack may be, for example, in the range of 50 to 70 percent of the total number of fuel cell arrays in the stack. The number of second stage fuel cell arrays in a three stage stack may be, for example, in the range of 31 to 23 percent of the total number of fuel cell arrays in the stack. The number of third stage fuel cell arrays in a three stage stack may be, for example, in the range of 19 to 7 percent of the total number of fuel cell arrays in the stack.

The stack could also include at least one fourth stage fuel cell array, and optionally at least one even further stage fuel cell array, having associated fuel gas distribution passages arranged to receive fuel exhaust from fuel cells of the array or arrays of the preceding stage. A single fuel cell array of the last stage could act as a scavenging stage.

In one embodiment, a steam extractor is connected between the fuel gas distribution passages of a final stage of one or more fuel cell arrays and the fuel gas distribution passages of a penultimate stage of fuel cell arrays to condense steam from the fuel exhaust received from the fuel gas distribution passages of the penultimate stage of fuel cell arrays prior to supply of said fuel exhaust to the fuel gas distribution passages of the final stage of fuel cell arrays. Thus, in a two-stage fuel cell stack, the steam extractor is connected between the first fuel gas distribution passages and the second fuel gas distribution passages to condense steam from the fuel exhaust received from the first fuel gas distribution passages prior to supply of said exhaust gas to the second fuel gas distribution passages. In a three-stage fuel cell stack, the steam extractor is connected between the second fuel gas distribution passages and the third fuel gas distribution passages to condense steam from the fuel exhaust received from the second fuel gas distribution passages prior to supply of said exhaust gas to the third fuel gas distribution passages, and so on. Additional steam extractors may be provided between the fuel gas distribution passages of two more other stages of fuel cell array(s) in a multi-stage stack. Removing water from the fuel supplied to the second and/or a subsequent stage fuel cell array(s) increases the Nernst voltage of that fuel and therefore the stack voltage as well as the stack efficiency.

BRIEF DESCRIPTION OF THE DRAWINGS

One embodiment of a fuel cell assembly in accordance with the invention will now be described by way of example only, with reference to the accompanying drawings, in which:

FIG. 5(a) is a partial plan view of the fuel side of one type of the interconnect of FIG. 4;

FIG. 5(b) is a partial plan view of the fuel side of another type of the interconnect of FIG. 4;

FIG. 6 is a perspective view of a cover plate for the stack of FIG. 3;

DETAILED DESCRIPTION OF THE DRAWINGS

The present invention relates to a fuel cell stack in which the overall fuel utilisation is improved by using the fuel exhaust from some of the fuel cells in the stack as the fuel supplied to others of the fuel cells in the stack. Thermal gradients along the stack, resulting for example from different voltages in individual fuel cell layers of the stack and/or from different functions of the layers in the stack, are alleviated in accordance with the invention by mixing the different fuel cell layers along the stack so that not all of the fuel cell layers supplying fuel exhaust to other fuel cells and/or not all of the fuel cell layers receiving fuel exhaust from other fuel cells are adjacent to each other.

The invention is applicable to any type of fuel cell stack in which the fuel cells are provided in layers, but is particularly suited to stacks of high temperature fuel cells such as molten carbonate fuel cells and solid oxide fuel cells where thermal gradients are potentially greater. Furthermore, in high temperature fuel cell stacks it is possible to reform a hydrocarbon source such as methane or natural gas to hydrogen within the stack. The invention is especially advantageous for fuel cell stacks in which such internal reforming occurs since the reforming is endothermic, and therefore removes heat from the fuel cells. For convenience, the invention will hereinafter be described with reference to a stack of planar solid oxide fuel cells designed to operate at a working temperature of from about 750° C. at the outlet. A preferred operating temperature range at the outlet is from about 750° C. to about 830° C.

Figure 1:
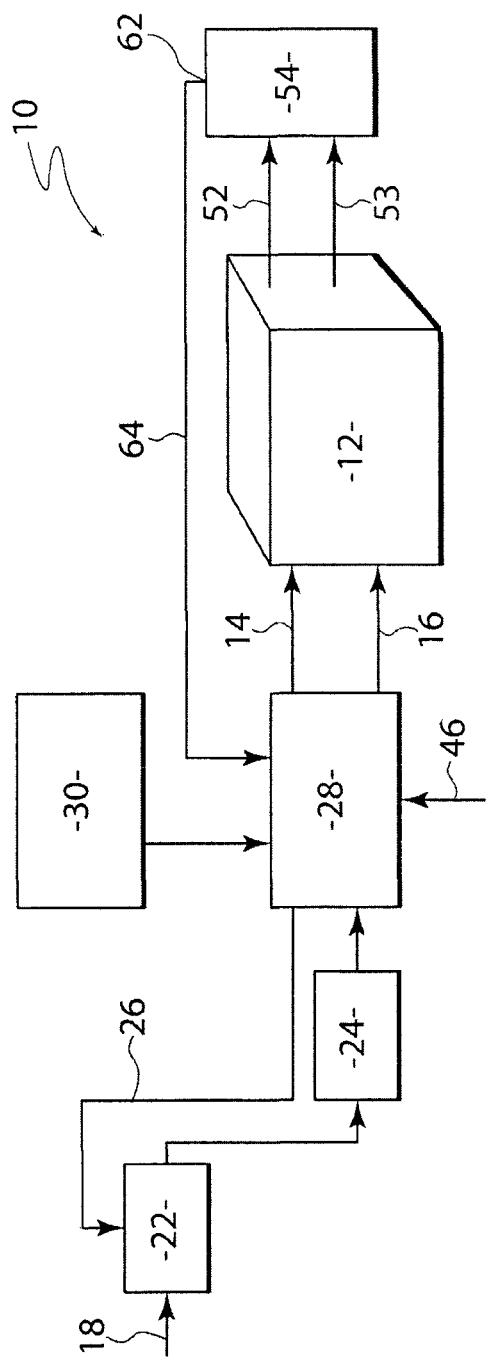
FIG. 1 is a schematic view of a basic fuel cell power generation system incorporating a planar solid oxide fuel cell stack.

Referring now to FIG. 1, there is illustrated a fuel cell system 10 including a fuel cell stack 12. Fuel and oxidant are supplied to the fuel cell stack 12 at 14 and 16 respectively.

The fuel source 18 is natural gas delivered by way of a jet pump venturi device 22 to a steam pre-reformer 24. Steam for the pre-reformer 24 is provided by way of a conduit 26 and mixed with the natural gas in the venturi device 22. The steam is formed in a heat exchange steam generator 28, water for the steam generator being derived from a water supply 30.

Steam reforming at elevated temperature on a nickel catalyst in the pre-reformer 24 partially converts the hydrocarbon fuel into hydrogen and carbon oxides. The degree of reforming in pre-reformer 24 is a function of the temperature and of the steam to carbon ratio, but the reaction, is endothermic and the fuel supplied from the pre-reformer to the fuel inlet 14 of the stack 12 is preheated in the heat exchanger 28.

Air used as the oxidant 46 is delivered to the fuel cell stack 12 after also being heated in the heat exchanger 28.

Details of the fuel cell stack 12 are not shown in FIG. 1, but it comprises alternating layers of fuel cells, and gas separators, with terminal plates at the ends of the stack. The fuel cells comprise a fully dense layer of electrolyte material, with a porous layer of cathode material and a porous layer of anode material on opposite sides. In a solid oxide fuel cell the electrolyte material may be yttrium-doped zirconia oxide, while the cathode material may be lanthanum strontium manganite and the anode material a zirconium nickel cermet. Such fuel cell stacks have been well documented elsewhere.

The gas separator plates separate the fuel cells and, in particular, the fuel gas supplied to the anode material of one fuel cell from the oxidant gas supplied to the cathode material of an adjacent fuel cell. The gas separator plates and the terminal end plates conveniently have grooves or channels formed therein on opposite surfaces for distributing, respectively, the fuel gas and oxidant gas across the anode material and cathode material of the adjacent fuel cells, but other forms of gas distribution may be used. The gas separators may be formed of a variety of different materials, but if they are electrically conductive they may act as interconnects transferring electricity generated by the fuel cells in the stack between the terminal end plates. In one embodiment the interconnects are formed of a ferritic stainless steel such as ZMG232L from Hitachi Metals.

The alternating fuel cell plates and, interconnect plates and the terminal end plates may be sealed together in the stack using glass seals capable of maintaining the sealing function at the elevated operating temperature of the fuel cell stack of from about 750° C.

At this temperature, hydrocarbons not steam reformed in the steam pre-reformer 24 that are supplied to the fuel inlet 14 of the stack 12 may be internally steam reformed in the stack by catalytic reaction with nickel anode material and/or with nickel disposed in fuel gas supply passages to the anode material of the fuel cells, including the fuel supply grooves or channels formed in the gas separator plates and one terminal end plate.

Hydrogen in the fuel and oxygen in the oxidant are respectively oxidised and reduced at the fuel cell anodes and cathodes, creating ionic conductivity through the electrolyte material of the fuel cells in the stack 12, which is balanced by an electrical current flow through the stack that is drawn off.

As described hereinafter, in the embodiments illustrated the fuel and oxidant gas flows in the stack across the respective sides of each fuel cell are essentially all co-flow, that is all in the same direction, or a mixture of co-flow and counter-flow, that is in opposite directions, according to the stage of the fuel cell arrays. However, the flows may be co-flow, counter-flow or transverse flow, that is at right angles to each other. Alternatively, the flow directions may be changed according to the position in the stack. For example, in one embodiment, the first twelve layers of fuel cell arrays in the stack, from the bottom, may be co-flow and the remainder may be counter-flow to further improve thermal gradients.

Only one stack 12 is shown in FIG. 1, but the fuel cell system may comprise plural stacks 12 connected in series or in parallel.

The exhaust fuel gas and oxidant gas from the illustrated fuel cell stack 12 are transferred by conduits 52 and 53 to a burner 54 for combustion of the fuel gas. The combustion exhaust 62 from the burner 54 is delivered by conduit 64 to the heat exchanger 28 to provide heat for the steam generator as well as for heating the pre-reformed fuel and the oxidant supplied to the fuel cell stack. The fuel cell exhaust, and therefore the combustion exhaust 62 contain steam.

Figure 2:
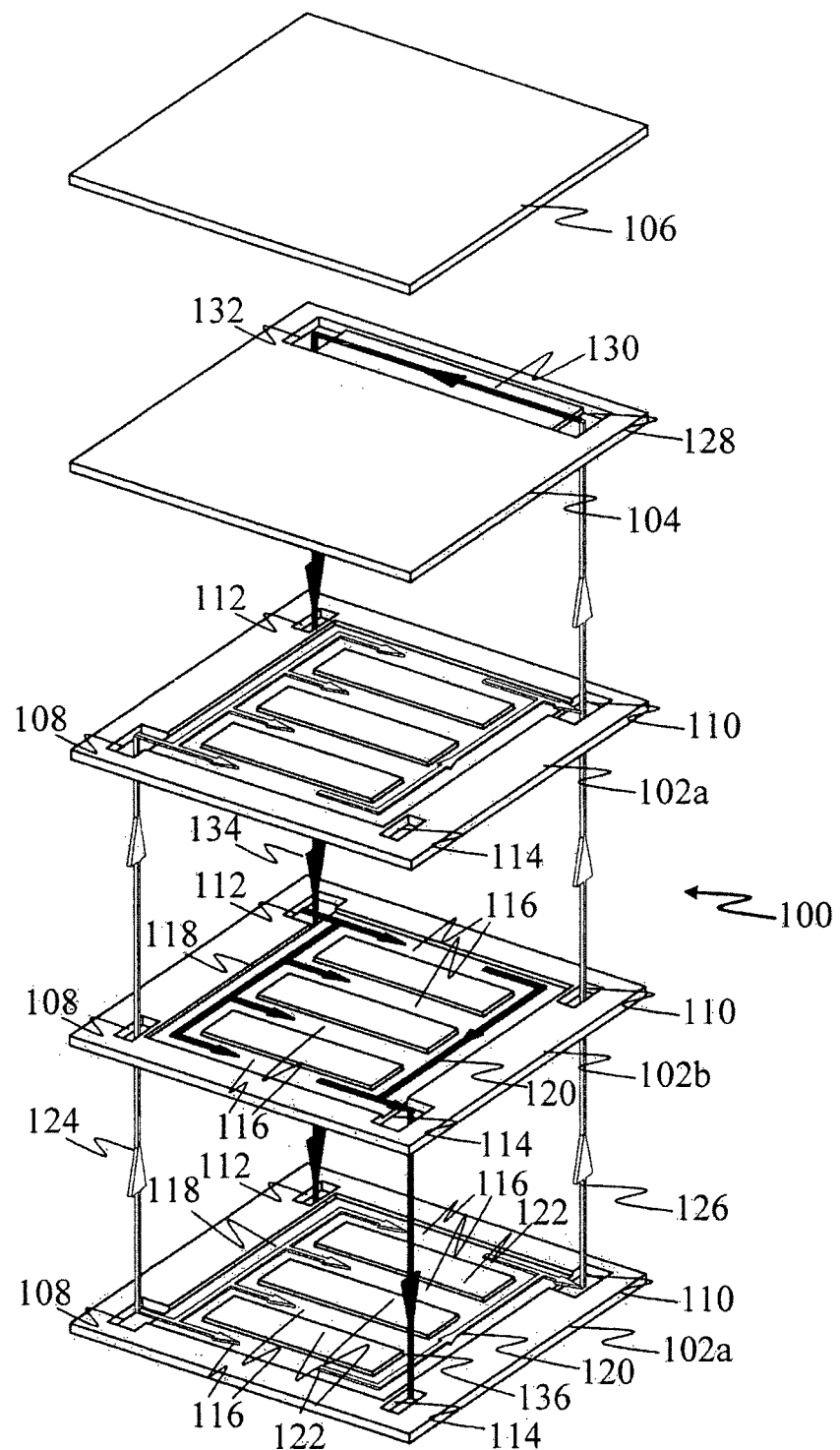
FIG. 2 is a schematic exploded view of part of a solid oxide fuel cell, stack in accordance with the invention.

Referring now to FIG. 2, there is schematically shown in exploded form and with only some of the components the upper part of a solid oxide fuel cell stack 100 in accordance with the invention. For clarity, the Figure only shows the three uppermost gas separator plates 102 of the stack, a manifold end plate 104 and a top plate 106. The fuel cell plates that would be present between adjacent gas separator plates 102 and between the manifold end plate 104 and the adjacent gas separator plate 102 are omitted from the Figure for the sake of clarity, as are other components such as spacers and seals and the air flow to and across the opposite sides to those illustrated of the gas separator plates 102 and of the manifold end plate 104. All of the fuel cells would be identical, and in the embodiment illustrated in FIG. 2 each fuel cell plate would only comprise a single fuel cell, not an array of plural fuel cells.

As illustrated, there are two types of gas separator plates, two first stage plates 102*a*, with the upper one adjacent the manifold end plate 104 and a second stage gas separator plate 102*b* interleaved between the gas separator plates 102*a*. The fuel side of the illustrated stack is internally manifolded, with aligned openings 108 through the gas separator plates for the fuel supply manifold, aligned openings 110 through the gas separator plates 102 for the fuel exhaust outlet manifold, aligned openings 112 through the gas separator plates 102 for a fuel exhaust inlet manifold, and aligned openings 114 for a fuel exhaust manifold. These openings would also extend through the other gas separator plates in the stack as well as any spacer or cover plates, and may extend through the fuel cell plates.

Each gas separator plate 102 has parallel channels 116 thereacross joining a fuel supply plenum 118 to a fuel exhaust plenum 120. The channels 116 are formed between ribs 122, but both are shown schematically. The channels 116 are designed to act as fuel gas distribution passages to distribute fuel across the anode of the respective fuel cell adjacent to that side of each gas separator plate 102, carrying fuel gas both to the anode and from the anode.

In gas separator plates 102*a*, the fuel supply plenum 118 is connected to the opening 108 forming the fuel supply manifold, while the fuel exhaust plenum 120 is connected to, the opening 110 forming the fuel exhaust outlet manifold. On the other hand, in the gas separator plate 102*b*, the fuel supply plenum 118 is connected to the opening 112 forming the fuel exhaust inlet manifold and the fuel exhaust plenum 120 is connected to the opening 114 forming the fuel exhaust manifold.

As shown by the arrow 124, the fuel supply passes upwardly through the openings 108 from the bottom of the stack before entering the fuel supply plenum 118 of each gas separator plate 102*a*. Likewise, as shown by the arrow 126, the fuel exhaust from the gas separator plates 102*a* passes from the fuel exhaust plenums 120 of those plates into the openings 110 and upwardly through the fuel exhaust outlet manifold formed by those openings.

At the top of the stack, the fuel exhaust from the gas separator plates 102*a* passes through a first opening 128 aligned with the openings 110 in the gas separator plate in the manifold end plate 104 and across that plate in a channel 130 before entering the fuel exhaust inlet manifold formed by openings 112 in the gas separator plates by way of an aligned second opening 132 in the manifold end plate 104. The top plate 106 closes the channel 130.

The fuel exhaust from the gas separator plates 102*a* then passes downwardly through the fuel exhaust inlet manifold formed by the openings 112 and enters the fuel supply plenum 118 of the gas separator plate 102*b* by way of the opening 112 in that plate. The downward flow of the fuel exhaust through the openings 112 is represented by the arrow 134.

The fuel exhaust from the gas separator plate 102*b* passes from the plenum 120 into the fuel exhaust manifold by way of opening 114 and continues downwardly to the bottom of the stack, as represented by the arrow 136.

In practice, therefore, fuel, which may be natural gas or other hydrocarbon and may be partially pre-reformed, enters the first fuel gas distribution passages 116 in the gas separator plates 102*a* by way of the opening 108 and fuel supply plenum 118 in those plates, where it contacts the anode of the respective adjacent fuel cell plate and reacts on the anode and at the anode/electrolyte interface. On the anode, the fuel is internally reformed to hydrogen and carbon oxides, and the hydrogen is then oxidised at the anode/electrolyte interface at the elevated operating temperature of the fuel cell while oxygen in the air or other oxidant on the other side of the fuel cell (not shown) is reduced, together causing ionic current flow through the electrolyte. While the fuel cell oxidation/reduction reaction is exothermic, the internal reforming reaction is endothermic leading to relative cooling of the gas separator plates 102*a* and adjacent fuel cells.

The fuel exhaust from these reactions passes from an exit side of the first fuel gas distribution passages 116 into the fuel exhaust outlet manifold, as represented by the arrow 126, by way of the fuel exhaust plenums 120 and openings 110 up to the top of the stack where it reverses direction in the manifold end plate 104 and passes downwardly through the fuel exhaust inlet manifold formed by openings 112, as represented by the arrows 134.

At the gas separator plate 102*b*, fuel exhaust from the first stage gas separator plates 102*a* and associated fuel cells passes from the respective opening 112 into the fuel supply plenum 118 and the second fuel gas distribution passages 116 of that plate, where it contacts the anode of the respective adjacent fuel cell plate and reacts on the anode and at the anode/electrolyte interface. Since at least the majority of the remaining fuel in the fuel exhaust from the first fuel gas distribution passages 116 has already been internally reformed, the amount of internal reforming at the anode associated with the second fuel gas distribution passages of the gas separator plate 102*b* will be relatively small, with a corresponding limited degree of cooling. On the other hand, since there is ample residual fuel in the fuel exhaust from the first fuel gas distribution passages 116, the same fuel cell reactions will occur when oxygen is supplied to the cathode side of the associated fuel cell. Thus, the reactions at the second fuel gas distribution passages 116 of the gas separator plate 102*b* are the same as those at the fuel cells associated with fuel gas distribution passages 116 of the gas separator plates 102*a* except that there will be less internal reforming and therefore less cooling effect. There will therefore be a temperature gradient between the fuel cell associated with the gas separator plate 102*b* and the fuel cells associated with the gas separator plates 102*a*.

The fuel exhaust from the second fuel gas distribution passages 116 in the gas separator plate 102*b* passes into the fuel exhaust manifold formed by the aligned openings 114, as represented by the arrow 136, by way of the fuel exhaust plenum 120 and openings 114 in the gas separator plate 102b down to the bottom of the stack and is discharged from the stack.

The aforementioned temperature gradient is alleviated by interleaving the second stage gas separator plate 102b and the associated fuel cell between the two first stage and cooler gas separator plates 102a and associated fuel cells. Alleviating the temperature gradients can have significant advantages in terms of thermal expansion differences as between the first stage and second stage components, thereby increasing the life and improving the performance of the fuel cell stack.

This interleaving arrangement may be repeated throughout the stack of fuel cell plates, and corresponding gas separator plates in a variety of arrangements such that there are either first stage gas separator plates and associated fuel cells disposed in the stack between two second stage gas separator plates and associated fuel cells or second stage gas separator plates and associated fuel cells between two first stage gas separator plates and associated fuel cells, or both.

Some examples of these arrangements are shown in Table 1 for 51-layer stacks, in which s1 represents a stage 1 layer of gas separator plate and associated fuel cell plate and s2 represents a stage 2 layer comprising a second stage gas separator plate and associated fuel cell plate. s3 in Example 5 represents a stage 3 layer of gas separator plate and associated fuel cell plate. Each of the Examples in Table 1 is described hereinafter.

TABLE 1

| Layer | Example 1 | Example 2 | Example 3 | Example 4 | Example 5 | Example 6 |
|---|---|---|---|---|---|---|
| | 39:12 | 39:12 | 39:12 | 39:12 | 42:9 | 33:13:5 |
| | | | staging ratio | | | |
| 51 | s1 | s1 | s1 | s2 | s1 | s1 |
| 50 | s1 | s1 | s1 | s1 | s1 | s2 |
| 49 | s1 | s2 | s1 | s2 | s1 | s1 |
| 48 | s2 | s1 | s2 | s1 | s1 | s2 |
| 47 | s1 | s1 | s1 | s1 | s2 | s1 |
| 46 | s1 | s1 | s1 | s2 | s1 | s2 |
| 45 | s1 | s2 | s1 | s1 | s1 | s1 |
| 44 | s2 | s1 | s1 | s1 | s1 | s1 |
| 43 | s1 | s1 | s2 | s1 | s1 | s2 |
| 42 | s1 | s1 | s1 | s2 | s2 | s1 |
| 41 | s1 | s1 | s1 | s1 | s1 | s1 |
| 40 | s2 | s2 | s1 | s1 | s1 | s2 |
| 39 | s1 | s1 | s1 | s1 | s1 | s1 |
| 38 | s1 | s1 | s2 | s1 | s1 | s1 |
| 37 | s1 | s1 | s1 | s2 | s1 | s2 |
| 36 | s2 | s1 | s1 | s1 | s2 | s1 |
| 35 | s1 | s2 | s1 | s1 | s1 | s1 |
| 34 | s1 | s1 | s1 | s1 | s1 | s2 |
| 33 | s1 | s1 | s2 | s1 | s1 | s1 |
| 32 | s2 | s1 | s1 | s1 | s1 | s1 |
| 31 | s1 | s1 | s1 | s2 | s1 | s2 |
| 30 | s1 | s2 | s1 | s1 | s2 | s1 |
| 29 | s1 | s1 | s1 | s1 | s1 | s1 |
| 28 | s2 | s1 | s1 | s1 | s1 | s2 |
| 27 | s1 | s1 | s2 | s1 | s1 | s1 |
| 26 | s1 | s1 | s1 | s1 | s1 | s1 |
| 25 | s1 | s2 | s1 | s1 | s2 | s2 |
| 24 | s2 | s1 | s1 | s1 | s1 | s1 |
| 23 | s1 | s1 | s1 | s1 | s1 | s1 |
| 22 | s1 | s1 | s2 | s1 | s1 | s2 |
| 21 | s1 | s2 | s1 | s2 | s1 | s1 |
| 20 | s2 | s1 | s1 | s1 | s2 | s1 |
| 19 | s1 | s1 | s1 | s1 | s1 | s2 |
| 18 | s1 | s1 | s2 | s1 | s1 | s1 |
| 17 | s1 | s2 | s1 | s1 | s1 | s1 |
| 16 | s2 | s1 | s1 | s1 | s1 | s2 |
| 15 | s1 | s1 | s1 | s2 | s2 | s1 |
| 14 | s1 | s1 | s2 | s1 | s1 | s1 |
| 13 | s1 | s2 | s1 | s1 | s1 | s3 |

TABLE 1-continued

| Layer | Example 1 | Example 2 | Example 3 | Example 4 | Example 5 | Example 6 |
|---|---|---|---|---|---|---|
| | 39:12 | 39:12 | 39:12 | 39:12 | 42:9 | 33:13:5 |
| | | | staging ratio | | | |
| 12 | s2 | s1 | s1 | s1 | s1 | s1 |
| 11 | s1 | s1 | s2 | s1 | s1 | s1 |
| 10 | s1 | s1 | s1 | s2 | s2 | s3 |
| 9 | s1 | s2 | s1 | s1 | s1 | s1 |
| 8 | s2 | s1 | s2 | s1 | s1 | s1 |
| 7 | s1 | s1 | s1 | s1 | s1 | s3 |
| 6 | s1 | s2 | s1 | s2 | s1 | s1 |
| 5 | s1 | s1 | s2 | s1 | s2 | s1 |
| 4 | s2 | s1 | s1 | s1 | s1 | s3 |
| 3 | s1 | s2 | s1 | s2 | s1 | s1 |
| 2 | s1 | s1 | s2 | s1 | s1 | s3 |
| 1 | s1 | s1 | s1 | s2 | s1 | s1 |

In Example 1, there are 39 stage 1 layers and 12 stage 2 layers in a repeating arrangement of 1 stage 2 layer every three stage 1 layers from the bottom of the stack.

In Example 2, there are also 39 stage 1 layers and 12 stage 2 layers, with, from the bottom of the stack, a repeating pattern of 1 stage 2 layer every 2 stage 1 layers followed by 1 stage 2 layer every 3 stage 1 layers to mid-way up the stack, and then 1 stage 2 layer every 4 stage 1 layers to adjacent the top of the stack. At the top of the stack, there is one arrangement of a stage 2 layer between 3 stage 1 layers beneath it and 2 stage 1 layers above it. This arrangement biases the cooling effect of the stage 1 reforming layers towards the top half of the stack.

Example 3 also shows 39 stage 1 layers and 12 stage 2 layers, with a repeating pattern of 1 stage 2 layer every 2 stage 1 layers from layer 3 to layer 14, followed by 1 stage 2, layer to every 3 stage 1 layers to layer 22, followed by 1 arrangement of 1 stage 2 layer every 4 stage 1 layers and then 1 stage 2 layer every 5 stage 1 layers, followed by 1 stage 2 layer every 4 stage 1 layers from layer 34 through to layer 48. At the top of the stack there are 3 stage 1 layers. This arrangement also biases the cooling effect of the stage 1 reforming layers towards the top half of the stack.

Example 4 shows another arrangement of 39 stage 1 layers and 12 stage 2 layers. In this arrangement the two halves of the stack from each end are mirror images of each, other with a gradually increasing spacing of the stage 2 layers from each end by one stage 1 layer, then two stage 1 layers, then three stage 1 layers, then four stage 1 layers. In the centre of the stack there are nine stage 1 layers between two adjacent stage 2 layers. Thus, there is a smaller proportion of stage 2 layers in the central half of the stack (layers 13 to 39) than in each end quarter of the stack. The proportion is less than half, at about 1:6 in the central half to about 1:2 in each end quarter. The effect of this arrangement is to bias the cooling effect of the reforming stage 1 layers towards the centre of the stack, helping to balance heat loss from each end of the stack. The effect of this relative to the arrangement of Example 1 may be seen in FIGS. 12 and 13 described hereinafter.

In Example 5, there are 42 stage 1 layers and 9 stage 2 layers, with 1 stage 2 layer every four stage 1 layers to layer 30, 1 stage 2 layer every 5 stage 1 layers from layer 31 to layer 42 and then 1 stage 2 layer between 4 stage 1 layers above and below it at the top of the stack. This arrangement concentrates the greatest number of reforming and cooling stage 1 layers at about two thirds the height of the stack. Changing the ratio of stage 1 to stage 2 layers impacts the maximum fuel utilisation at which the stack can operate.

Example 6 in Table 1 shows a variation not illustrated in FIG. 2 in which, in addition to stage 1 and stage 2 layers, there are stage 3 layers. The stage 3 layers (gas separator plates and associated fuel cells) receive fuel exhaust from the stage 2 layers, as illustrated schematically in FIG. 10. In this arrangement, there are 33 stage 1 layers, 13 stage 2 layers and 5 stage 3 layers, with all of the stage 3 layers being towards the bottom of the stack and all of the stage 2 layers being above them. In the first four layers from the bottom of the stack the stage 1 and stage 3 layers alternate, followed by 1 stage 3 layer every 2 stage 1 layers to layer 13 followed by 1 stage 2 layer every 2 stage 1 layers from layer 14 to layer 46. In layers 41 to 51, the stage 1 and stage 2 layers alternate.

It will be appreciated by those skilled in the art that while FIG. 2 illustrates the fuel gas distribution passages being formed in the gas separator plates 102 as channels 116, this is not essential. Instead, the gas distribution passages could be defined by protrusions on the anode side of the fuel cells or, for example, by means disposed between the gas separator plates and the adjacent fuel cell plates. The fuel gas distribution passages are therefore effectively provided between a gas separator plate and the anode side of an adjacent fuel cell and are associated with the fuel cells in the sense that they distribute the gas across the fuel cell.

Figure 3:
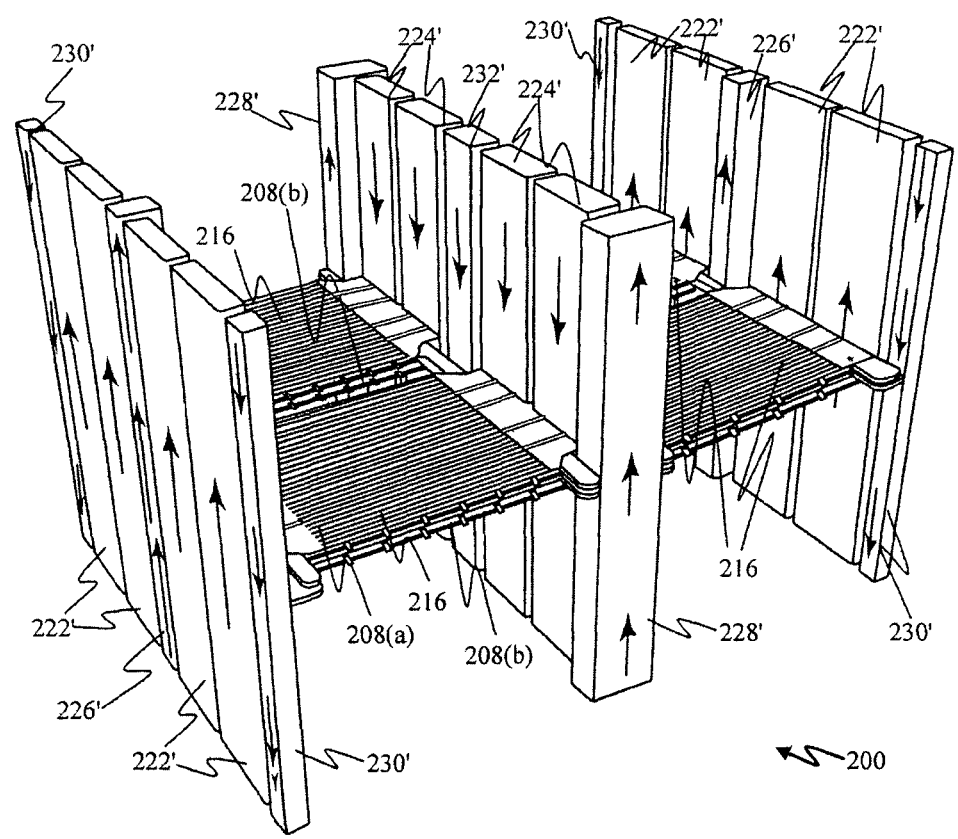
FIG. 3 is another perspective partial view of a solid oxide fuel cell stack in accordance with the invention.
Figure 4:
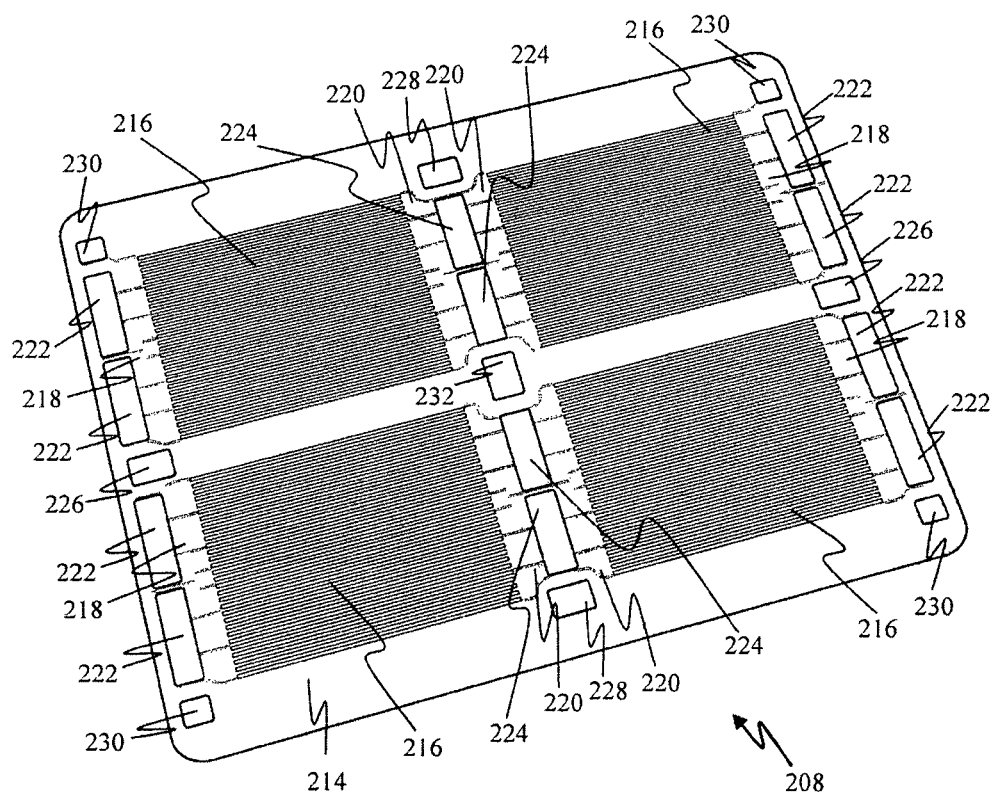
FIG. 4 is a perspective view of the oxidant side of an interconnect of the stack of FIG. 3.

Turning now to FIGS. 3 to 6, there is shown the bare skeleton of a fuel cell stack showing the manifolding arrangement for a two stage stack in which each fuel cell layer comprises an array of four fuel cells supported in a cover plate 202 (FIG. 6) described hereinafter. In FIGS. 3 to 6, the gas distribution passages are provided in the gas separator plates 208 (FIGS. 4, 5a, 5b). As in FIG. 2, there are two types of gas separator plate, a first stage plate 208a illustrated in part in FIG. 5a and a second stage gas separator plate 208b illustrated in part in FIG. 5b. In each of these Figures, only one half of the anode side 210 is illustrated, each with two arrays 212 of fuel gas distribution passages shown for two of the fuel cells of the fuel cell arrays. Each gas separator plate 208 will have four arrays 212 of fuel gas distribution passages with, in each case for gas separator plates 208a and 208b, the non-illustrated left hand side of the anode side 210 being a mirror image of the right hand side illustrated in FIGS. 5a and 5b, respectively.

Since the oxidant side of the fuel cell stack is not staged, the oxidant side 214 of each gas separator plate 208 is identical, and one is illustrated in FIG. 4. Thus, the anode side 210 of the gas separator plate 208 illustrated in FIG. 4 may be either a first stage so that the gas separator plate is a plate 208(a) as partly illustrated in FIG. 5a or a second stage gas separator plate 208(b) as partly illustrated in FIG. 5b.

Referring to FIG. 4, the oxidant or cathode side 214 of the gas separator plate 208 also has four arrays 216 of oxidant gas distribution passages for distributing air or other oxidant across the cathode of four respective fuel cells in an adjacent array (not shown). The gas separator plate 208 may be formed of ferritic stainless steel as described above, with each array 216 of oxidant gas distribution passage being formed by multiple parallel channels with ribs in between that contact, the fuel cell plates and may be coated on their top surfaces with a spinel oxide as described in WO 1996/028855.

For each array 216 of oxidant gas distribution passages, there is an inlet end connected to an oxidant supply plenum 218 and an outlet end connected to an oxidant exhaust plenum 220. Each oxidant supply plenum 218 receives oxidant through a pair of oxidant supply manifold openings 222, while the oxidant exhaust plenums 220 open to oxidant exhaust manifold openings 224. The openings 224 extend through the centre of the plate, and each left and right hand (in the Figure) pair of arrays 216 of oxidant gas distribution passages share a respective pair of the openings 224.

The gas separator plates 208 have additional openings through them for the fuel gas. Between the oxidant supply manifold openings 222 are two opposed fuel supply manifold openings 226. At the outer ends of the central array of oxidant exhaust manifold openings 224 are two opposed fuel exhaust outlet manifold openings 228. At the four corners of the gas separator plate 208 are respective fuel exhaust inlet manifold openings 230, and in the centre of the plate is a single fuel exhaust manifold opening 232.

Referring to FIG. 5a, each array 212 of fuel gas distribution passages comprises a series of parallel channels formed in, the separator plate between a fuel supply plenum 234 and a fuel exhaust plenum 236. Between the channels of the arrays 212 are residual ribs that engage the anode side of a respective fuel cell (not shown) of each array 212. To ensure electrically conductive contact, the rib tops may be coated with nickel.

A series of transverse channels 238 across the arrays 212 ensure balanced fuel gas flow from the supply plenum 234 to the exhaust plenum 236 and therefore balanced contact of the fuel gas with, the anodes.

Each pair of adjacent arrays 212 share a common fuel supply plenum 234 and fuel exhaust plenum 236, and fuel gas is supplied to the fuel supply plenum 234 through the fuel supply manifold opening 226 which opens into the centre of the plenum. In contrast, fuel exhaust is discharged from the fuel exhaust plenum 236 through the fuel exhaust outlet manifold openings 228 at the ends of the exhaust plenum. These fuel exhaust outlet manifold openings 228 are shared by the left hand pair of arrays 212, which, as noted above, are a mirror image of the right hand pair shown, in FIG. 5a.

Referring now to FIG. 5b, the anode side 210 of gas separator plate 208(b) is very similar to the anode side 210 of the gas separator plate 208(a) described above so only the differences will be described. Furthermore, the same reference numerals have been given to the corresponding components in FIGS. 5a and 5b.

In FIG. 5b, the fuel supply plenum 234 shared by two adjacent arrays 212 in the gas separator plate 208(b) receives fuel exhaust from the fuel exhaust outlet manifold defined by openings 228 via the fuel exhaust inlet manifold openings 230 which open to the plenum 234 at its ends. The fuel exhaust from the plate 208(b) passes from the fuel exhaust plenum 236 into the single fuel exhaust manifold opening 232 shared with the mirror image arrays 212.

Turning now to FIG. 3, the two gas separator plates 208a and 208b and their connections to the manifolds are shown schematically with the cathode side 214 facing upwardly. Only the two gas separator plates are shown, for convenience with no fuel cell arrays between them or above and below them. As in FIG. 4, the entire gas separator plates 208 are shown, with the four arrays 216 of oxidant fuel distribution passages.

The manifolds formed by the respective openings through the gas separator plates 208 and corresponding openings in the cover plate 202 are illustrated schematically in FIG. 3 and will be referred to by the corresponding reference numeral for the respective openings through the gas separator plates, followed by a "'".

In use of the stack 200, fuel gas passes upwardly from a stack bottom end plate (not shown) through the fuel supply manifolds 226' and enters the plenums 234 of the first stage gas separator plates 208a as shown in FIG. 5a. The reacted fuel gas then exhausts from the fuel exhaust plenums 236 of the first stage gas separator plates 208a upwardly through the fuel exhaust outlet manifolds 228'. Correspondingly, oxidant passes upwardly from the bottom end plate of the stack through the oxidant supply manifolds 222' and enters the oxidant supply plenums 218 on the cathode side 214 of the gas separator plates 208. After reacting at the respective cathodes, the oxidant exhaust enters the oxidant exhaust manifolds 224' from the oxidant exhaust plenums 220 and passes downwardly to the bottom end plate. This occurs for both the first stage gas separator plates 208a and the second stage gas separator plates 208b.

Fuel exhaust from the first stage gas separator plates 208a passes upwardly through the fuel exhaust outlet manifolds 228' until, as in FIG. 2, it reaches a manifold end plate (not shown) at the top of the stack and reverses direction to pass downwardly through the fuel exhaust inlet manifolds 230' from where it enters the fuel supply plenums 234 of the second stage gas separator plates 208b. After reacting at the anode of the respective fuel cell, the second stage exhaust passes from the fuel exhaust plenums 236 of the gas separator plates 208b into the common fuel exhaust manifold 232'. In the fuel exhaust manifold 232', the second stage fuel exhaust passes downwardly to the bottom manifold plate, from where it and the oxidant exhaust are discharged from the stack as described, with reference to FIG. 1.

The arrangement of first stage gas separator plates 208a and second stage gas separator plates 208b in the stack 200 may be as described with reference to FIG. 2 and, for example, any of Examples 1 to 5 in Table 1.

Turning now to FIG. 6, the cover plate 202 has a similar overall shape to the gas separator plates 208 and a respective one is received between two adjacent gas separator plates 208 and between an end gas separator plate 208 and an adjacent manifold end plate (not shown).

The cover plate 202 has corresponding manifold openings to those in the gas separator plates 208, which are given the same reference numerals but followed by a "''" and will not be described further. The cover plate may also be formed of ferritic stainless steel such as ZMG232L from Hitachi Metals, and also has four major openings 240 through its thickness in an array corresponding to the arrays 212 and 216 of gas distribution passages in the gas separator plates 208. Respective fuel cell plates (not shown) are received in the major openings 240, all of the fuel cell plates being identical and being as described above. The fuel cell plates are sealed in the major openings 240 using glass seals (not shown) that prevent oxidant and fuel gases passing from one face to the other.

In the stack, each cover plate is also sealed to the adjacent gas separator plates to ensure the appropriate passage of gas from an inlet manifold to an outlet manifold without leakage. Such seals may also be provided by glass seals or, for example, by laser welding the plates 202 and 208 together.

Figure 7:
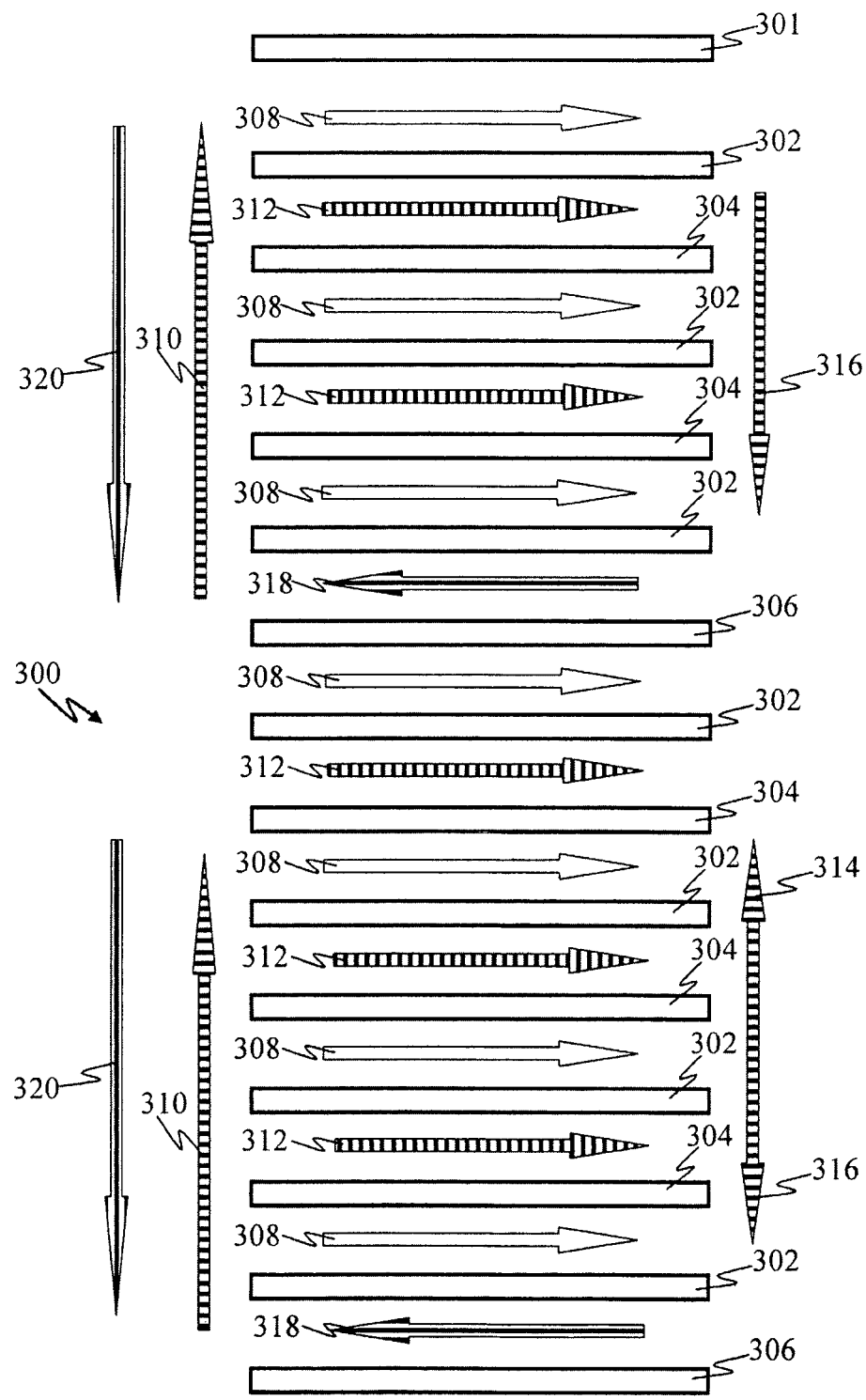
FIG. 7 is a schematic elevational view of one arrangement of the various plates of a fuel cell stack according to the invention and of the manifolding.

FIG. 7 illustrates in a two-dimensional manner a variation of the partial stack 100 of FIG. 2, as a partial stack 300. The top portion of the stack is shown, with the various plates being represented by blocks. The representation includes fuel cell plates 302 between each pair of other plates, with a manifold end plate 301 at the top. Between the fuel cell plates are a variety of first stage gas separator plates 304 and second stage gas separator plates 306. The Figure represents a repeating unit of three adjacent first stage gas separator plates for every one second stage gas separator plate, except at the top of the stack where there are two first stage gas separator plates. The arrangement therefore reflects Example 2 of Table 1.

FIG. 7 also represents the fuel gas flows. The oxidant manifold gas flows are omitted for clarity, but it will be appreciated from the description of FIGS. 3 to 6 above that they are the same throughout the stack, with the oxidant passing upwardly through the stack and across the layers between the cathode side of the fuel cells as represented by the arrows 308, before the oxidant exhaust is carried downwardly again through an oxidant exhaust manifold (not shown) to the bottom manifold end plate to be exhausted from the stack.

On the fuel side, fuel gas is carried upwardly from the bottom manifold end plate (not shown) through a fuel supply manifold represented by the arrows 310. Fuel gas passes from the fuel supply manifold between the first stage gas separator plates 304 and the anode side of the adjacent fuel cell plates 302 through the first stage gas distribution passages as represented by the arrows 312.

The reacted first stage exhaust fuel gas then enters the fuel exhaust outlet manifold represented by arrow 314 through which it is conveyed upwardly to the top manifold end plate 301, where it reverses direction and is conveyed downwardly through a fuel exhaust inlet manifold represented by the arrows 316 to the second stage fuel gas distribution passages represented by arrows 318 between the second stage fuel cell plates 306 and the anode side of the adjacent fuel cell plates 302. The second stage fuel gas exhaust then enters the fuel outlet manifold represented by arrows 320 through which it is conveyed to the bottom, manifold end plate and discharged from the stack.

In FIG. 7, the lowermost arrows 314 and 316 are combined, illustrating that the first stage fuel exhaust manifold 228 and the second stage fuel inlet manifold 230 may be combined, in which case flow rates upwards and downwards through the combined manifold may be low.

In the arrangement of FIG. 7, the fuel gas flows through the first and second fuel gas distribution passages 312 and 318 are in the opposite directions. The oxidant gas flows through the oxidant gas distribution passage 308 may also be reversed if desired to provide a counterflow arrangement (relative to the passages 312).

Figure 8:
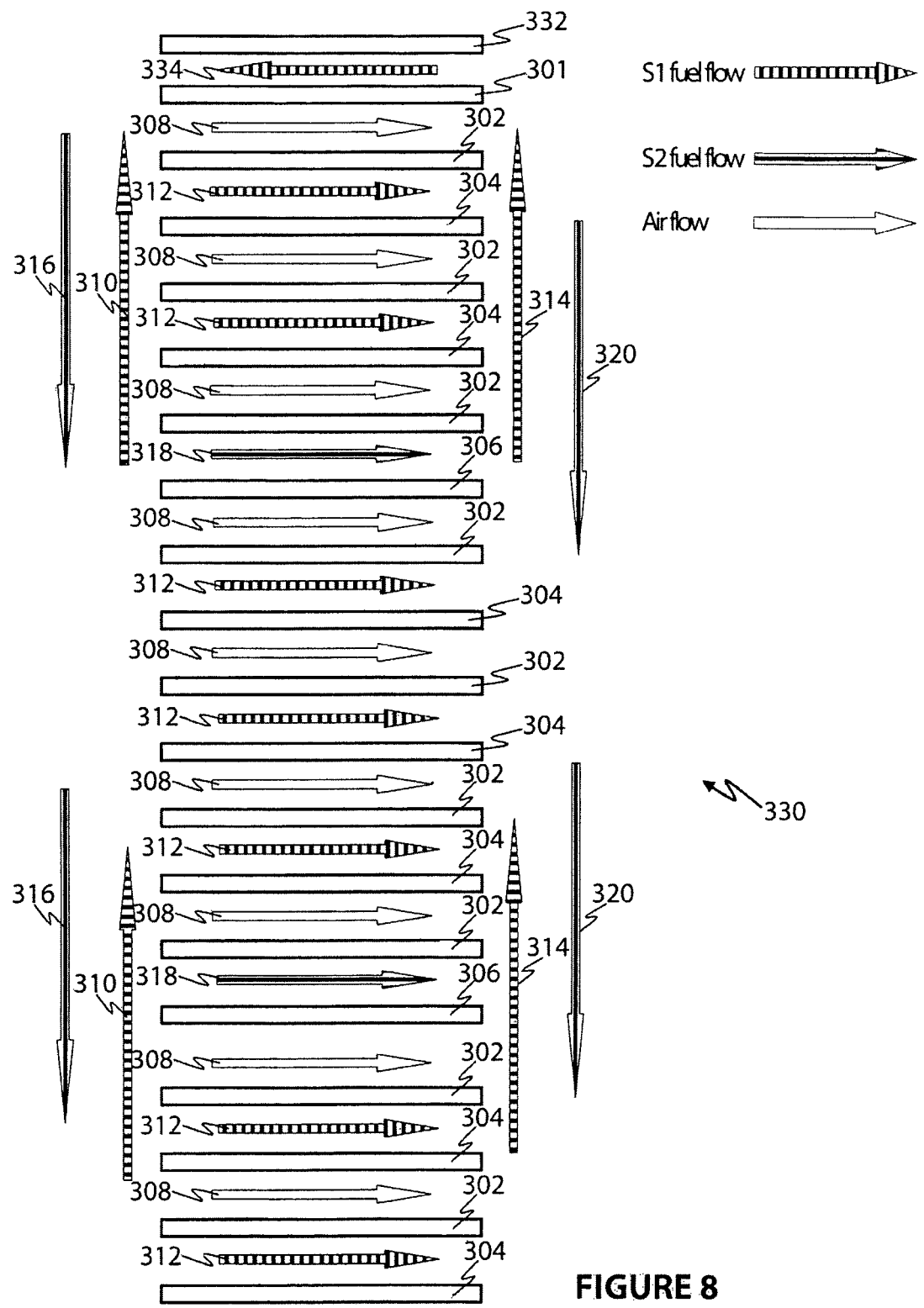
FIG. 8 is a similar view to FIG. 7 but of another arrangement.

FIG. 8 is a similar representation to FIG. 7 of a partial stack 330 in which for convenience the same reference numerals are used for the same parts as in FIG. 7.

As in FIG. 7, FIG. 8 represents a repeating unit of three adjacent first stage gas separator plates for every one second stage gas separator plate, except at the top of the stack where there are two first stage gas separator plates. The arrangement therefore reflects. Example 2 of Table 1. The difference from FIG. 7 is that, as in FIG. 2, all of the gas flows through the first and second stage gas distribution passages 312 and 318, as well as in the oxidant passages 308, are in, the same direction, from left to right in the Figure. FIG. 8 also illustrates the transfer of the first stage fuel exhaust at the top of the stack from the fuel exhaust outlet manifold 314 into the fuel exhaust inlet manifold 316 between the manifold end plate 301 and a top plate 332. The channel through which this transfer occurs is represented by the arrow 334.

Figure 9:
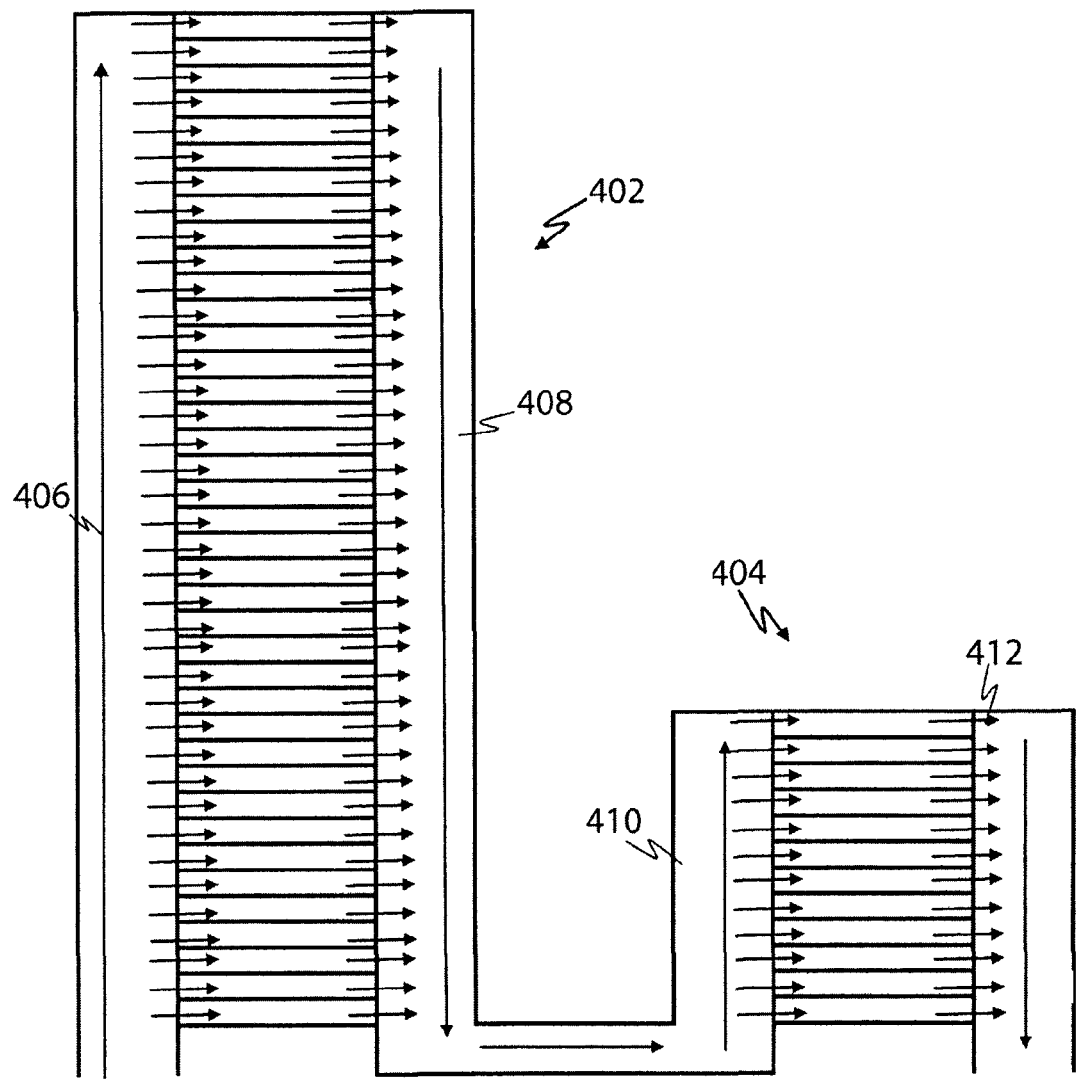
FIG. 9 illustrates schematically the manifolding for the fuel side of one type of fuel cell stack according to the invention.

FIG. 9 represents schematically an embodiment of any one of Examples 1 to 4 of Table 1 but in which the stage one and stage two gas flows are for convenience represented in two series connected stacks, a first stage stack 402 and a second stage stack 404. In practice of course the first and second stage gas flows would be in a single stack, with the second stage gas separator plates interleaved between the first stage gas separator plates as shown in Table 1.

In FIG. 9, the fuel gas supply manifold 406 is shown as conveying the fuel gas upwardly from a bottom manifold end plate (not shown) to the first stage gas separator plates and the first stage exhaust manifold 408 is shown as conveying the first stage fuel exhaust upwardly to the top manifold end plate. Correspondingly, the second stage fuel exhaust inlet manifold 410 conveys the first stage fuel exhaust downwardly to the second stage gas separator plates, and the second stage fuel exhaust is then conveyed downwardly through the exhaust manifold 412 to the bottom manifold end plate (not shown) from where it is discharged from the stack.

Figure 10:
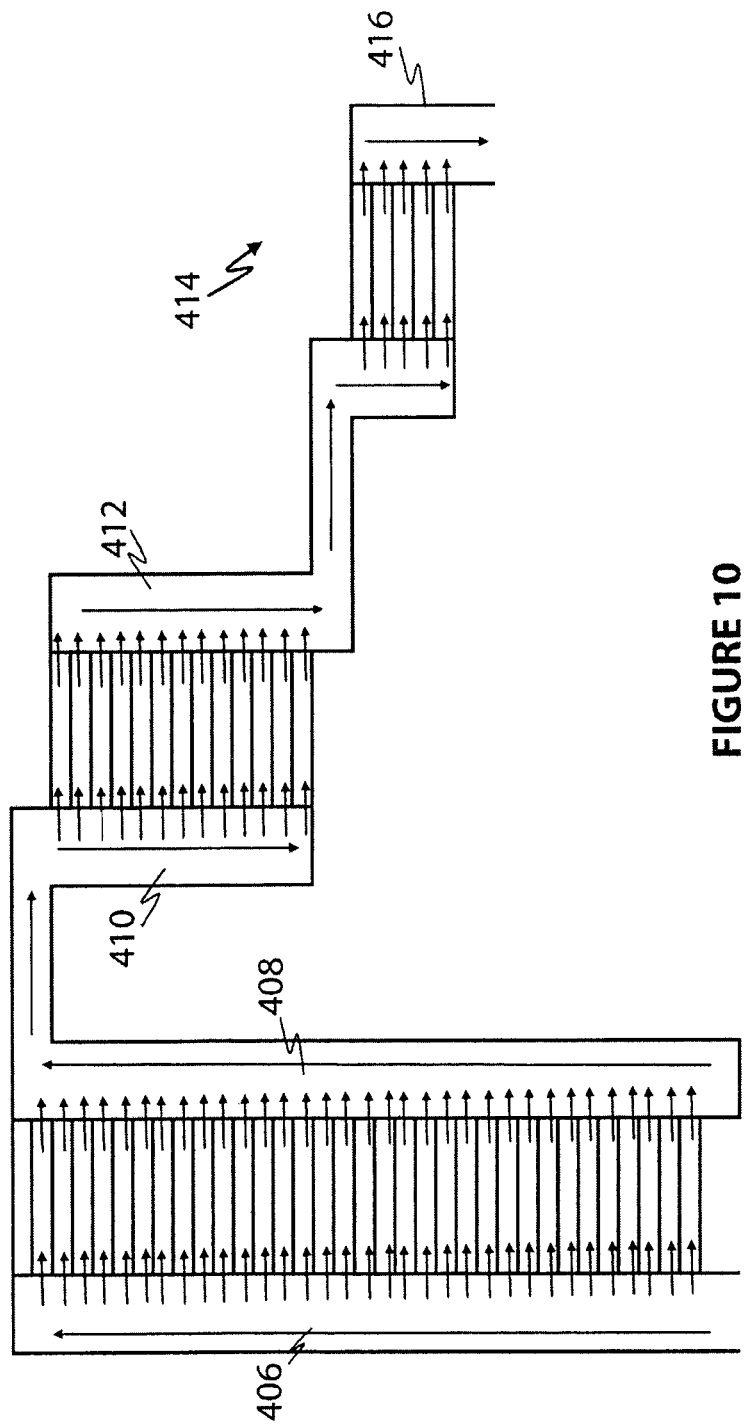
FIG. 10 is a view similar to FIG. 9 but of another type of fuel cell stack according to the invention.

FIG. 10 is a similar representation to FIG. 9 but for the three stage stack of Example 6 of Table 1. Thus, rather than being discharged from the stack, the second stage fuel exhaust is conveyed downwardly to the third stage gas separator plates 414 and then downwardly through a third stage fuel exhaust manifold 416, after passing through third stage fuel gas distribution passages for reaction of the fuel gas on the anode side of the adjacent fuel cells, to be discharged from the stack. In contrast to FIG. 9, it will be seen that the flow directions in the first stage fuel gas supply manifold 406 and fuel exhaust manifold 408 are both upwardly, and that the flow directions in the second stage fuel exhaust inlet manifold 410 and exhaust manifold are both downwardly.

Figure 11:
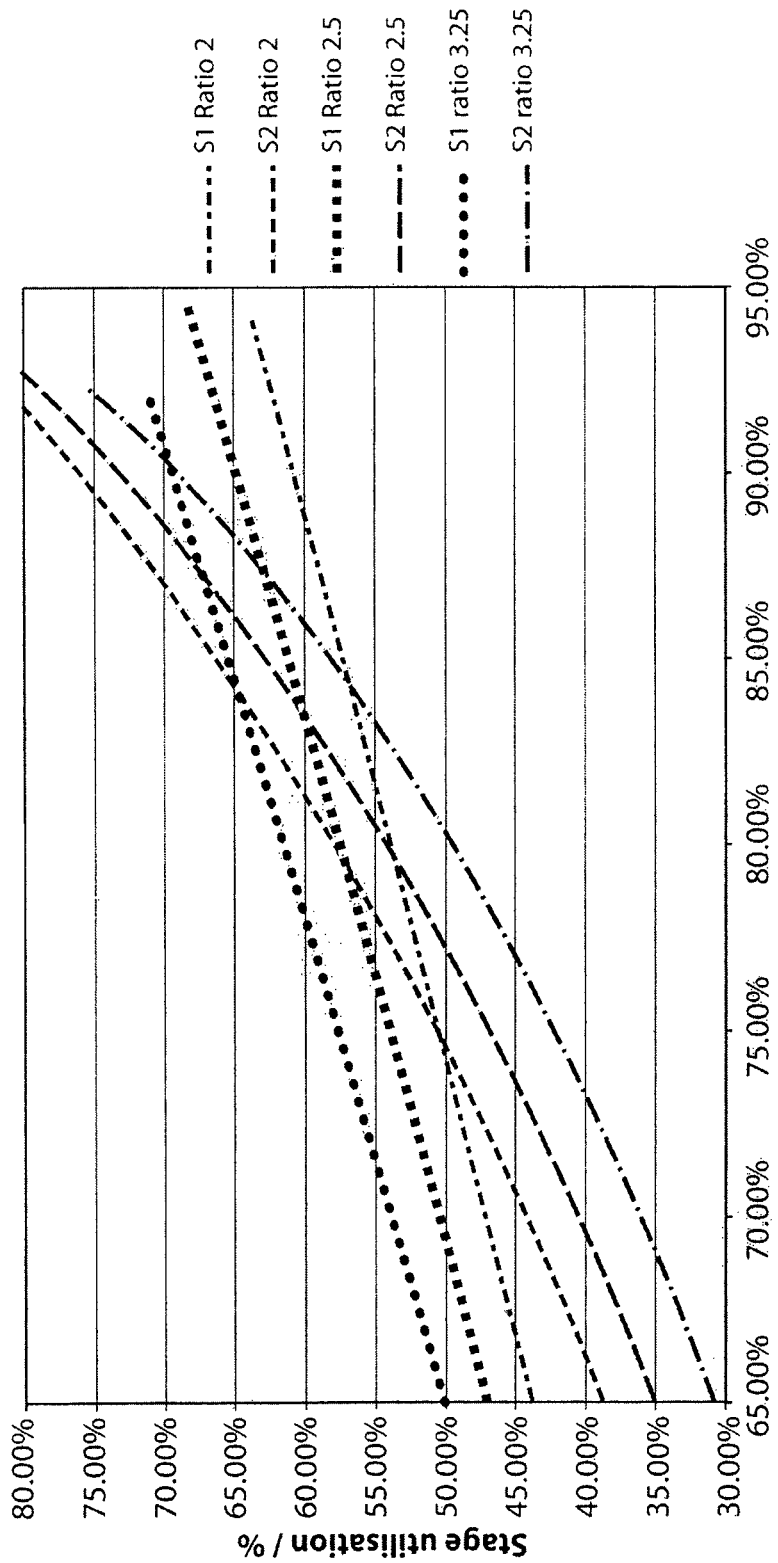
FIG. 11 is a graph representing fuel utilisation in the fuel cell stack according to the invention.

FIG. 11 is a graph showing overall fuel utilisation against the individual fuel cell array fuel utilisation in a two stage stack. The graph shows fuel utilisations for three different ratios of stage one layers to stage two layers (2:1, 2.5:1 and 3.25:1), and shows that at higher stage one to stage two ratios, a higher overall fuel utilisation can be achieved with an even fuel utilisation for both stages.

In particular the target overall fuel utilisation determines the staging ratio. Ideally, the stage 2 fuel utilisation will always be slightly lower than the stage 1 fuel utilisation for the following reasons (or at least never higher in stage 2 compared to stage 1).

1) stage 2 conditions can lead to oxidation of parts of the respective fuel cells earlier than in stage 1 due to the lower $H_2$ concentrations (lower Nernst potential)—especially as the fuel cells degrade due to extended use;
2) stage 2 is more sensitive to fuel utilisation variation—stage 1 is linear whereas stage 2 has a higher order function;
3) stage 2 will get the residual fuel from stage 1—therefore all errors in, for example flows, current and potential leaks will be a burden on stage 2.

Taking this into account a preferred staging ratio is 3.25:1 with an overall target fuel utilisation of 85%, which would lead to a stage 1 fuel utilisation of 66% and a stage 2 fuel utilisation of 58% assuming the same current/current density for every layer/array regardless of the stage. It also allows that the overall fuel utilisation (due to errors, leaks, etc.) could go up to 89% with both stages still running at the same utilisation.

A further advantage of the invention is that by providing the two or more stages of fuel cell arrays in the stack in which adjacent arrays are connected in series, the same current and current density are assured for each array. This, in contrast to an arrangement in which first and subsequent stage fuel cell arrays are provided in respective stacks, no separate control mechanism is required to ensure the same current and current density in all of the arrays of all of the stages.

Figure 12:
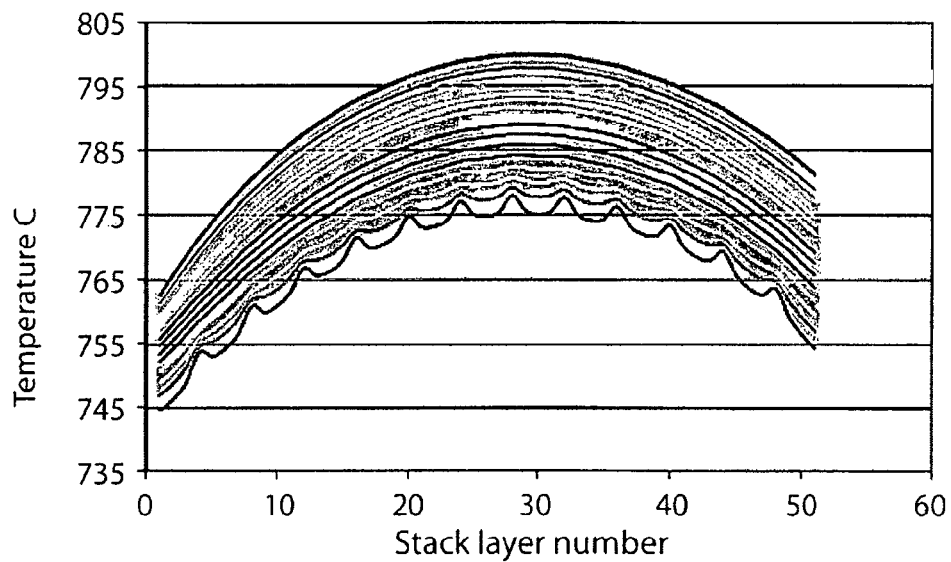
FIGS. 12 and 13 are graphs representing the temperature profile along the stack and across the fuel cells from the fuel gas inlet to the fuel exhaust gas outlet for the stacks of Examples 1 and 4 respectively.
Figure 13:
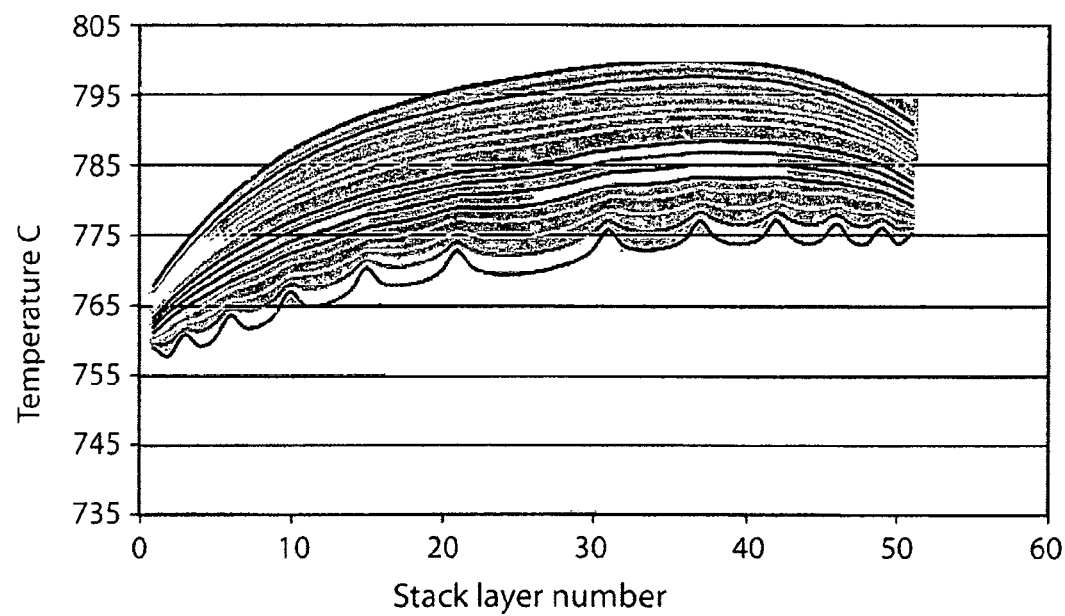

FIGS. 12 and 13 are graphs illustrating the thermal profile of running the reforming fuel cell stacks of Examples 1 and 4 respectively. The x-axis in each graph represents the numbers of the layers 1 to 51 in the stack, while the y-axis shows the temperature at a number of sensors (represented by each line) on each layer spaced from the fuel inlet (the bottom line in each case) to the fuel exhaust outlet (the top line in each case) for the fuel cell. In general terms, it may be seen that the temperature increases from the fuel inlet to the fuel exhaust outlet, and that the temperature is higher at the top of the stack (layer 51) than at the bottom (layer 1) but with a maximum remote from the top and bottom ends of the stack partly due to heat losses at the ends. The peaks in the bottom line of each graph reflect the location of the stage 2 layers and their reduced cooling effect relative to the reforming stage 1 layers.

FIG. 12 shows that in the embodiment of Example 1 the reduced cooling effect of the evenly spaced stage 2 layers has been spread along the length of the stack, greatly improving the thermal gradient compared to an arrangement in which the stage 1 layers are all closer to one end of the stack and the stage 2 layers are all close to the other end of the stack, but still with a maximum temperature towards the centre of the stack.

In contrast, FIG. 13 shows that spacing the stage 2 layers as in Example 4 flattens the temperature profile, so that the temperature gradient along the stack has been reduced.

In both cases, the temperature gradient across the fuel cells towards the centre of the stack is about 25° C., and this is also true at the top of the stack of Example 1. In Example 4, the temperature gradient across the fuel cells at the top of the stack is only about 15° C.

Those skilled in the art will appreciate that the invention described herein is susceptible to variations and modifications other than those specifically described. It is to be understood that the invention includes all such variations and modifications which fall within its spirit and scope. The invention also includes all the steps and features referred to or indicated in this specification, individually or collectively, and any and all combinations of any two or more of said steps or features.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:
1. A fuel cell assembly comprising:
a stack of multiple fuel cell arrays, each fuel cell array comprising one or more fuel cells and each fuel cell comprising an electrolyte layer, an anode layer on one side of the electrolyte layer and a cathode layer on an opposite side of the electrolyte layer, said stack further comprising fuel gas distribution passages which open to the anode layers of the fuel cells in the stack;
one or more fuel supply manifolds for supplying fuel gas to fuel gas distribution passages in the stack;
the fuel cell arrays comprising at least first stage fuel cell arrays having associated first fuel gas distribution passages connected to the one or more fuel gas supply manifolds to receive fuel gas directly therefrom and second stage fuel cell arrays having associated second fuel gas distribution passages arranged to receive fuel exhaust from the fuel cells of the first stage fuel cell arrays for supply of said fuel exhaust to the fuel cells of the second stage fuel cell arrays in the stack;
wherein the anode layers of the fuel cells of the first stage fuel cell arrays and/or the first fuel gas distribution passages comprise steam reforming catalyst for steam reforming hydrocarbon in the fuel gas contacting said anode layers and/or the first fuel gas distribution passages;

wherein from 18 to 36% of the fuel cell arrays in the stack are second stage fuel cell arrays and there is a greater proportion of first stage fuel cell arrays than second stage fuel cell arrays; and wherein at least one of the first and second stages of fuel cell arrays comprises fuel cell arrays that are disposed in the stack between fuel cell arrays of the other of the first and second stages of fuel cell arrays.

2. A fuel cell assembly according to claim 1, wherein an inlet side of the second fuel gas distribution passages opening to the anode layer of each fuel cell of the second stage fuel cell arrays is connected directly to an exhaust side of the first fuel gas distribution passages opening to the anode layers of at least two fuel cells of the first stage fuel cell arrays.

3. A fuel cell assembly according to claim 1, wherein at least one fuel manifold is provided between an inlet side of the second fuel gas distribution passages and an exhaust side of the first fuel gas distribution passages to supply fuel exhaust from plural first fuel gas distribution passages to plural second fuel gas distribution passages.

4. A fuel cell assembly according to claim 3, wherein said at least one fuel manifold comprises a fuel exhaust outlet manifold connected to a fuel exhaust inlet manifold whereby fuel exhaust from the first fuel gas distribution passages passes in one direction through the fuel exhaust outlet manifold and in an opposite direction along the fuel exhaust inlet manifold to the second fuel gas distribution passages.

5. A fuel cell assembly according to claim 1, wherein each fuel cell array of the one of the first and second stages of fuel cell arrays is disposed adjacent at least one fuel cell array of the other of the first and second stages of fuel cell arrays.

6. A fuel cell assembly according to claim 5, wherein each second stage fuel cell array is disposed in the stack between a respective two first stage fuel cell arrays.

7. A fuel cell assembly according to claim 1, wherein in at least part of the stack there is a repeating pattern of three first stage fuel cell arrays and one second stage fuel cell array.

8. A fuel cell assembly according to claim 1, wherein in at least part of the stack there is a repeating pattern of four first stage fuel cell arrays and one second stage fuel cell array.

9. A fuel cell assembly according to claim 1, wherein there is a repeating pattern of arrangement of first stage fuel cell arrays and second stage fuel cell arrays throughout the stack.

10. A fuel cell assembly according to claim 1, wherein there is a greater number of second stage fuel cell arrays in a first half of the stack than in a second half of the stack.

11. A fuel cell assembly according to claim 1, wherein there is a smaller proportion of second stage fuel cell arrays in a central half of the stack than in each end quarter of the stack.

12. A fuel cell assembly according to claim 11, wherein the proportion of second stage fuel cell arrays in each end quarter of the stack is at least twice as great as in the central half of the stack.

13. A fuel cell assembly according to claim 1, wherein the number of first stage fuel cell arrays in the stack is in the range of 64 to 82% of the total number of fuel cell arrays in the stack.

14. A fuel cell assembly according to claim 1, wherein all of the second fuel gas distribution passages are connected to at least one fuel exhaust manifold for directing fuel exhaust from the second fuel gas distribution passages exteriorly of the stack or for recycling to the stack.

15. A fuel cell assembly according to claim 1, wherein the fuel cell arrays further comprise at least one third stage fuel cell array having associated third fuel gas distribution passages arranged to receive fuel exhaust from fuel cells of the second stage fuel cell arrays for supply of said fuel exhaust to the fuel cells of the at least one third stage fuel cell array in the stack.

16. A fuel cell assembly according to claim 15, wherein at least one fuel manifold is provided between an inlet side of the third fuel gas distribution passages and an exhaust side of the second fuel gas distribution passages to supply fuel exhaust from the second fuel gas distribution passages to the third fuel gas distribution passages.

17. A fuel cell assembly according to claim 15, wherein, as a proportion the total number of first, second and third stage arrays of fuel cells in the stack, the first stage arrays comprise 50 to 70%, the second stage arrays comprise 31 to 23%, and the third stage arrays comprise 19 to 7%.

18. A fuel cell assembly according to claim 15, wherein each third stage fuel cell array is disposed in the stack adjacent at least one first stage fuel cell array.

19. A fuel cell assembly according to claim 18, wherein each third stage fuel cell array is disposed in the stack between two first stage fuel cell arrays.

20. A fuel cell stack according to claim 18, wherein all of the second stage fuel cell arrays are disposed towards a first end of the stack and all of the third stage fuel cell arrays are disposed towards a second end of the stack.

21. A fuel cell assembly according to claim 1, further comprising a steam extractor connected between the fuel gas distribution passages of a final stage of fuel cell arrays and the fuel gas distribution passages of a penultimate stage of fuel cell arrays to condense steam from the fuel exhaust received from the fuel gas distribution passages of the penultimate stage of fuel cell arrays prior to supply of said fuel exhaust to the fuel gas distribution passages of the final stage of fuel cell arrays.

* * * * *